US012694459B2

(12) United States Patent
Shimizu et al.

(10) Patent No.: US 12,694,459 B2
(45) Date of Patent: Jul. 28, 2026

(54) INFORMATION PROCESSING SYSTEM AND INFORMATION PROCESSING METHOD

(71) Applicant: SONY GROUP CORPORATION, Tokyo (JP)

(72) Inventors: Itaru Shimizu, Tokyo (JP); Asako Kawakami, Tokyo (JP); Yuichi Tsubouchi, Tokyo (JP); Tomoko Kouno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 380 days.

(21) Appl. No.: 17/422,569

(22) PCT Filed: Jan. 15, 2020

(86) PCT No.: PCT/JP2020/001075
§ 371 (c)(1),
(2) Date: Jul. 13, 2021

(87) PCT Pub. No.: WO2020/153193
PCT Pub. Date: Jul. 30, 2020

(65) Prior Publication Data
US 2022/0100820 A1    Mar. 31, 2022

(30) Foreign Application Priority Data
Jan. 23, 2019    (JP) ................................ 2019-009426

(51) Int. Cl.
*G06Q 50/18*        (2012.01)
*G06N 3/08*         (2023.01)

(52) U.S. Cl.
CPC ............. *G06Q 50/184* (2013.01); *G06N 3/08* (2013.01); *G06Q 2220/18* (2013.01)

(58) Field of Classification Search
CPC ..... G06Q 50/184; G06Q 2220/18; G06N 3/08
USPC .......................................................... 705/59
See application file for complete search history.

(56) References Cited

U.S. PATENT DOCUMENTS

| | | | | |
|---|---|---|---|---|
| 10,446,126 B1 * | 10/2019 | Kaye | ........................ | G10H 1/20 |
| 2006/0064381 A1 | 3/2006 | Tamori | | |
| 2008/0235268 A1 | 9/2008 | Miyoshi et al. | | |
| 2009/0063574 A1 | 3/2009 | Kim | | |

(Continued)

FOREIGN PATENT DOCUMENTS

| | | |
|---|---|---|
| CN | 1744196 A | 3/2006 |
| CN | 101014994 A | 8/2007 |

(Continued)

OTHER PUBLICATIONS

International Search Report and Written Opinion of PCT Application No. PCT/JP2020/001075, issued on Mar. 10, 2020, 11 pages of ISRWO.

*Primary Examiner* — Courtney P Jones
(74) *Attorney, Agent, or Firm* — CHIP LAW GROUP

(57) ABSTRACT

An information processing system including a content generation unit that generates content with use of one or more pieces of material data generated from original content, and a metadata addition unit that adds, to the content, content metadata including material information associated with the material data used for generation of the content and generation information associated with generation of the content.

12 Claims, 13 Drawing Sheets

(56) References Cited

U.S. PATENT DOCUMENTS

| | | | |
|---|---|---|---|
| 2010/0050854 A1* | 3/2010 | Huet | G10H 1/0025 |
| | | | 84/611 |
| 2011/0075851 A1* | 3/2011 | LeBoeuf | G10L 25/51 |
| | | | 381/56 |
| 2016/0372096 A1* | 12/2016 | Lyske | G11B 27/036 |
| 2017/0092247 A1 | 3/2017 | Silverstein | |
| 2017/0092248 A1* | 3/2017 | Gozzi | G10H 1/0025 |
| 2017/0357785 A1* | 12/2017 | Kim | H04L 9/0894 |
| 2018/0068091 A1* | 3/2018 | Gaidar | G06F 21/16 |
| 2018/0285818 A1* | 10/2018 | Soltani | G06Q 50/01 |
| 2019/0228339 A1* | 7/2019 | Kim | G06F 16/907 |
| 2019/0362696 A1* | 11/2019 | Balassanian | G10H 1/0025 |
| 2020/0090632 A1* | 3/2020 | Rein | G06N 20/00 |
| 2020/0110821 A1* | 4/2020 | Chan | H04L 9/0637 |
| 2020/0134585 A1* | 4/2020 | Xu | H04L 9/3236 |
| 2020/0394990 A1* | 12/2020 | Chanquion | G10H 1/0025 |
| 2021/0049990 A1* | 2/2021 | Medeot | G06N 7/01 |
| 2021/0065324 A1* | 3/2021 | Zhao | G06Q 50/184 |

FOREIGN PATENT DOCUMENTS

| | | | | | |
|---|---|---|---|---|---|
| CN | 101271470 | A | 9/2008 | | |
| CN | 101375327 | A | 2/2009 | | |
| CN | 103021390 | A | 4/2013 | | |
| JP | 10-055389 | A | 2/1998 | | |
| JP | 2001-136363 | A | 5/2001 | | |
| JP | 2004-139184 | A | 5/2004 | | |
| JP | 2006-072422 | A | 3/2006 | | |
| JP | 2006085045 | A | 3/2006 | | |
| JP | 2006099645 | A | 4/2006 | | |
| JP | 2007122186 | A | 5/2007 | | |
| JP | 2008-233819 | A | 10/2008 | | |
| JP | 2009-054155 | A | 3/2009 | | |
| JP | 2018-537727 | A | 12/2018 | | |
| KR | 101915587 | B1 | 11/2018 | | |
| WO | 2008/062816 | A1 | 5/2008 | | |
| WO | WO-2020121225 | A1 * | 6/2020 | .......... | G10H 1/0025 |

* cited by examiner

20a

INFORMATION PROCESSING TERMINAL

20b

INFORMATION PROCESSING TERMINAL

20c

INFORMATION PROCESSING TERMINAL

3

10

MUSIC PROVIDING SERVER

10: MUSIC PROVIDING SERVER

120

COMMUNICATION UNIT

100

CONTROL UNIT

140

STORAGE UNIT

F I G . 3
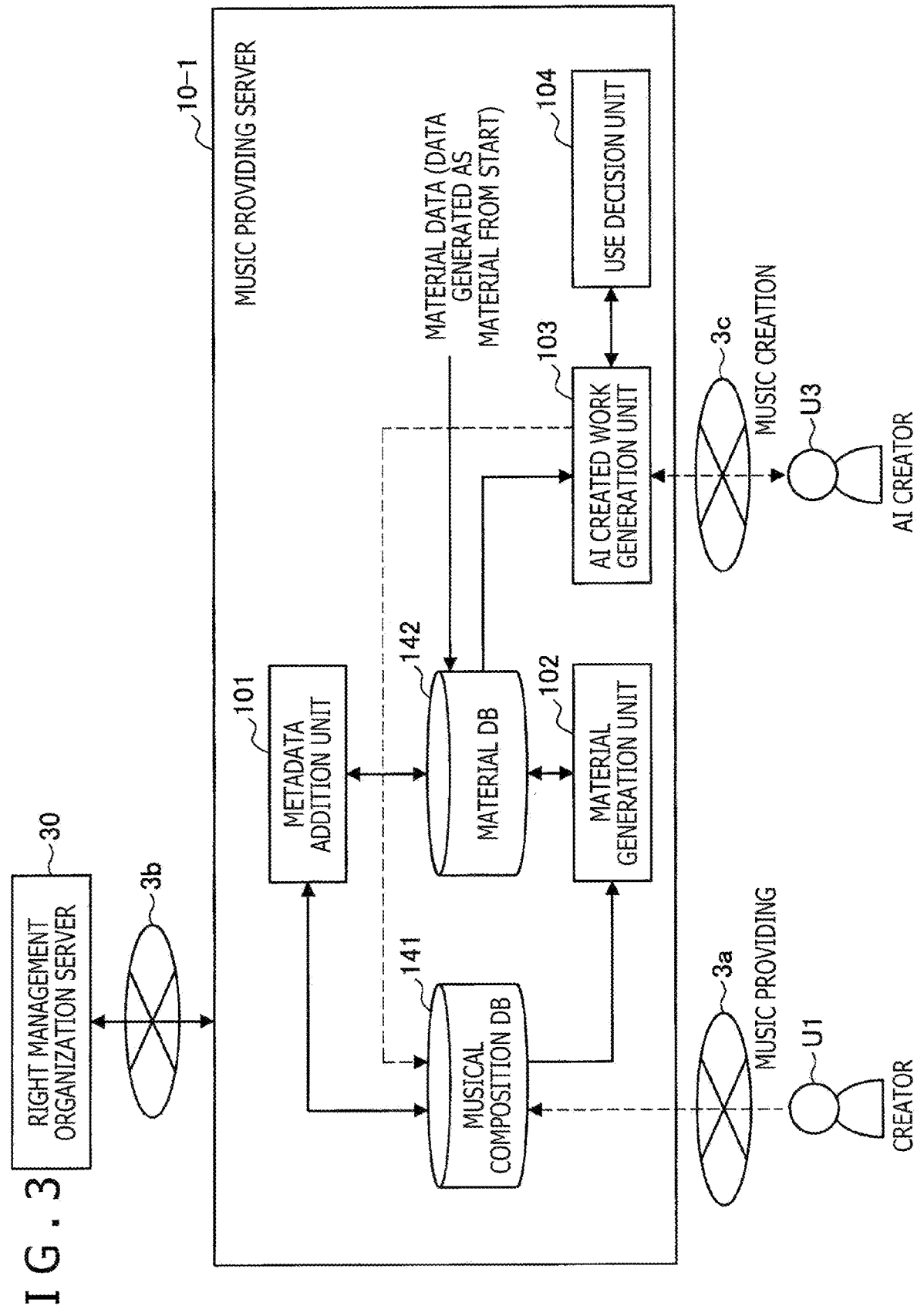

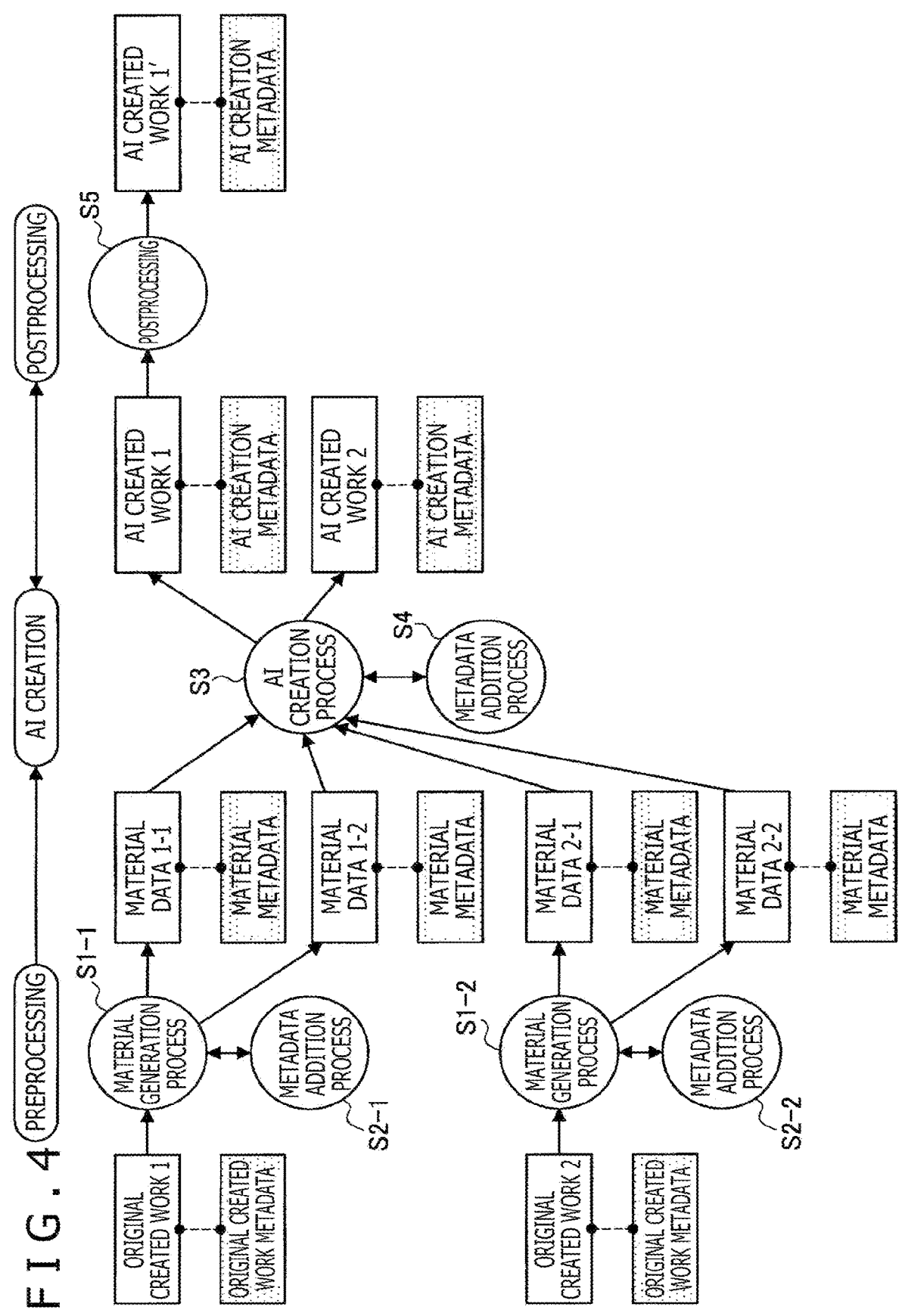
F I G . 4

FIG. 5

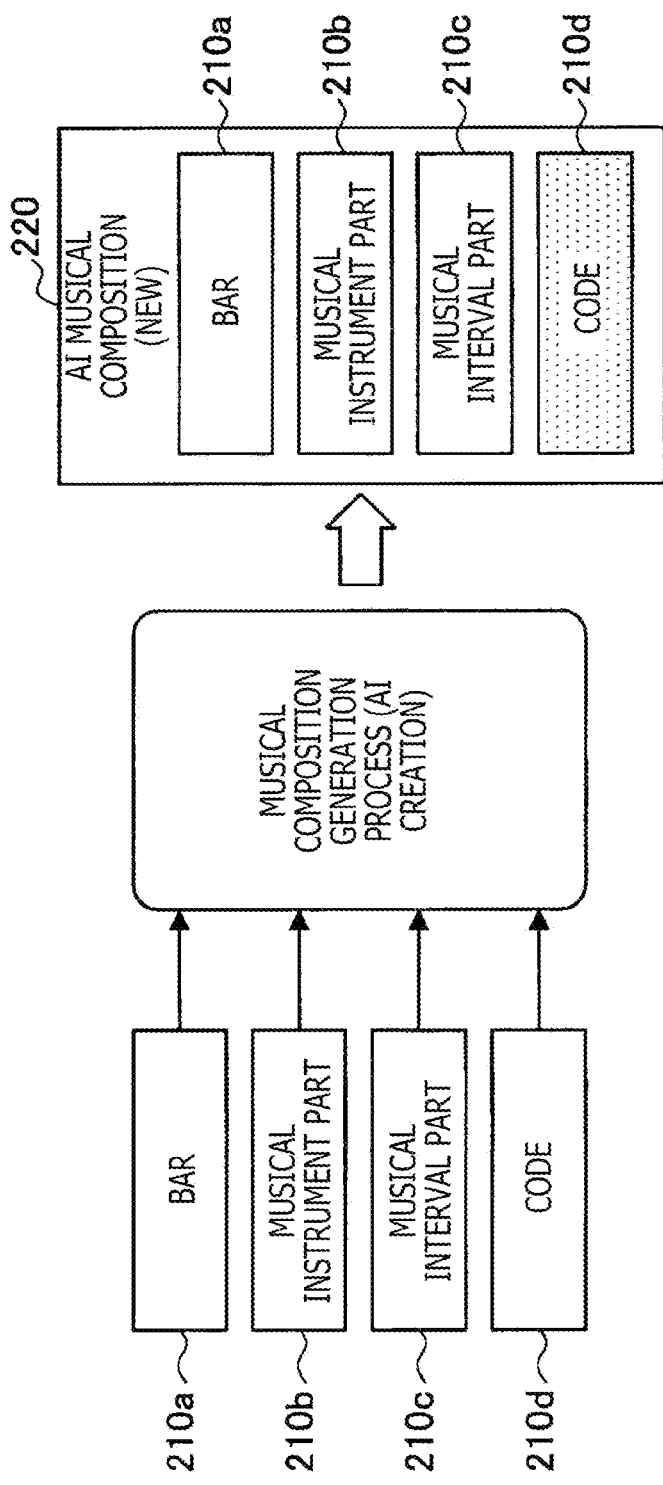
F I G . 6

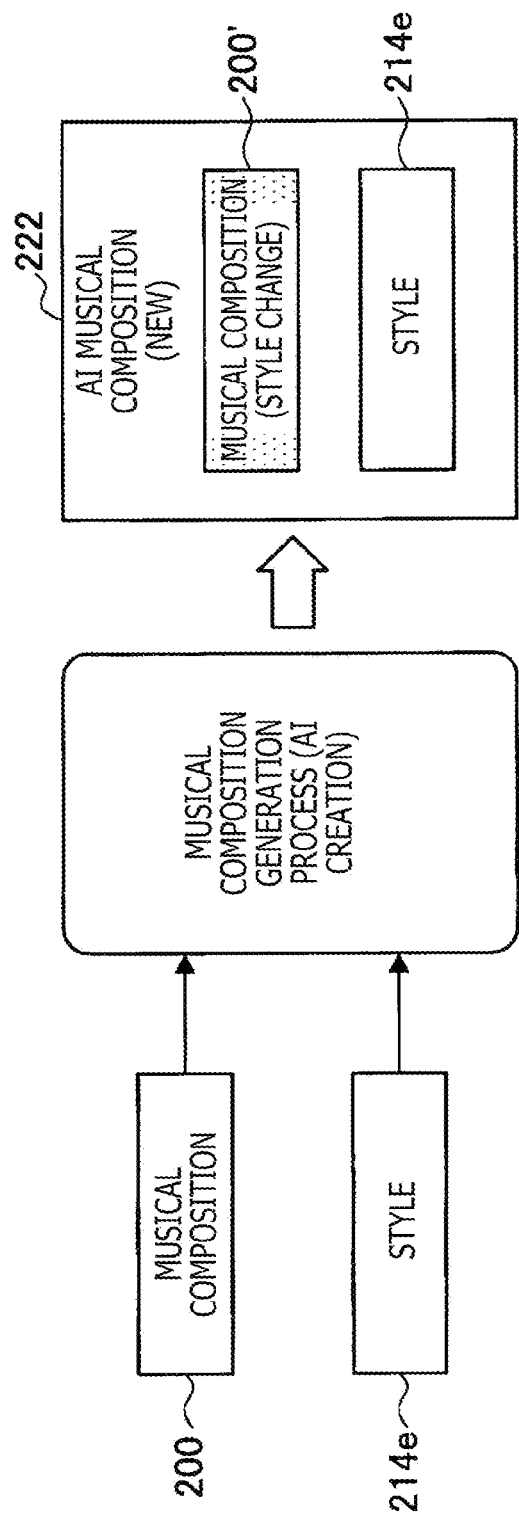
F I G . 7

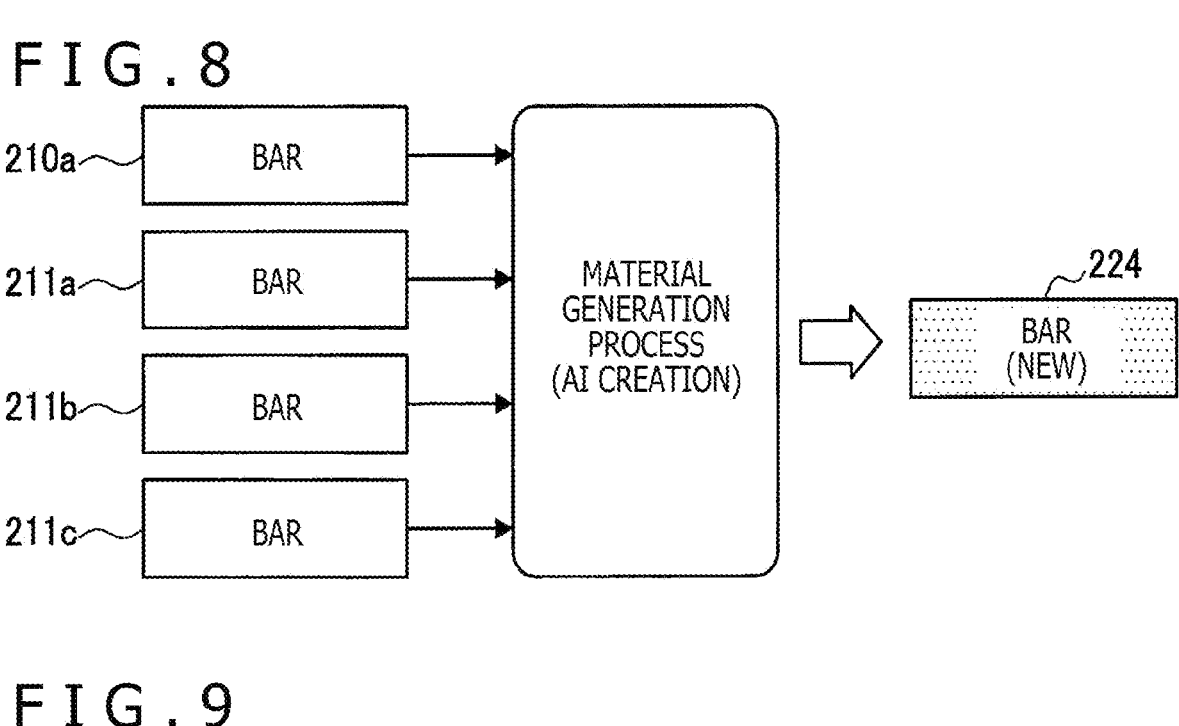
F I G . 8
F I G . 9

F I G . 1 0
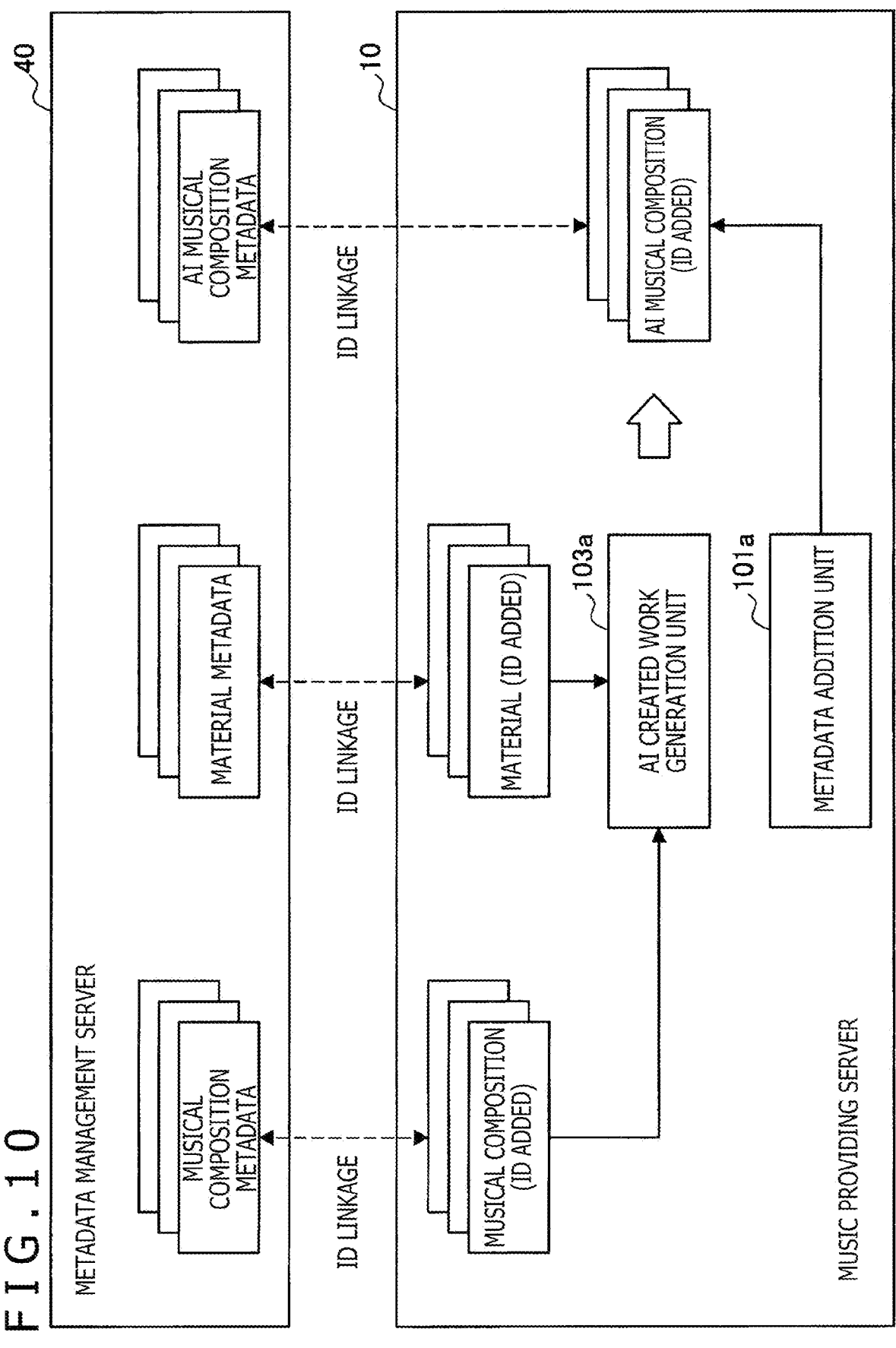

F I G . 1 1
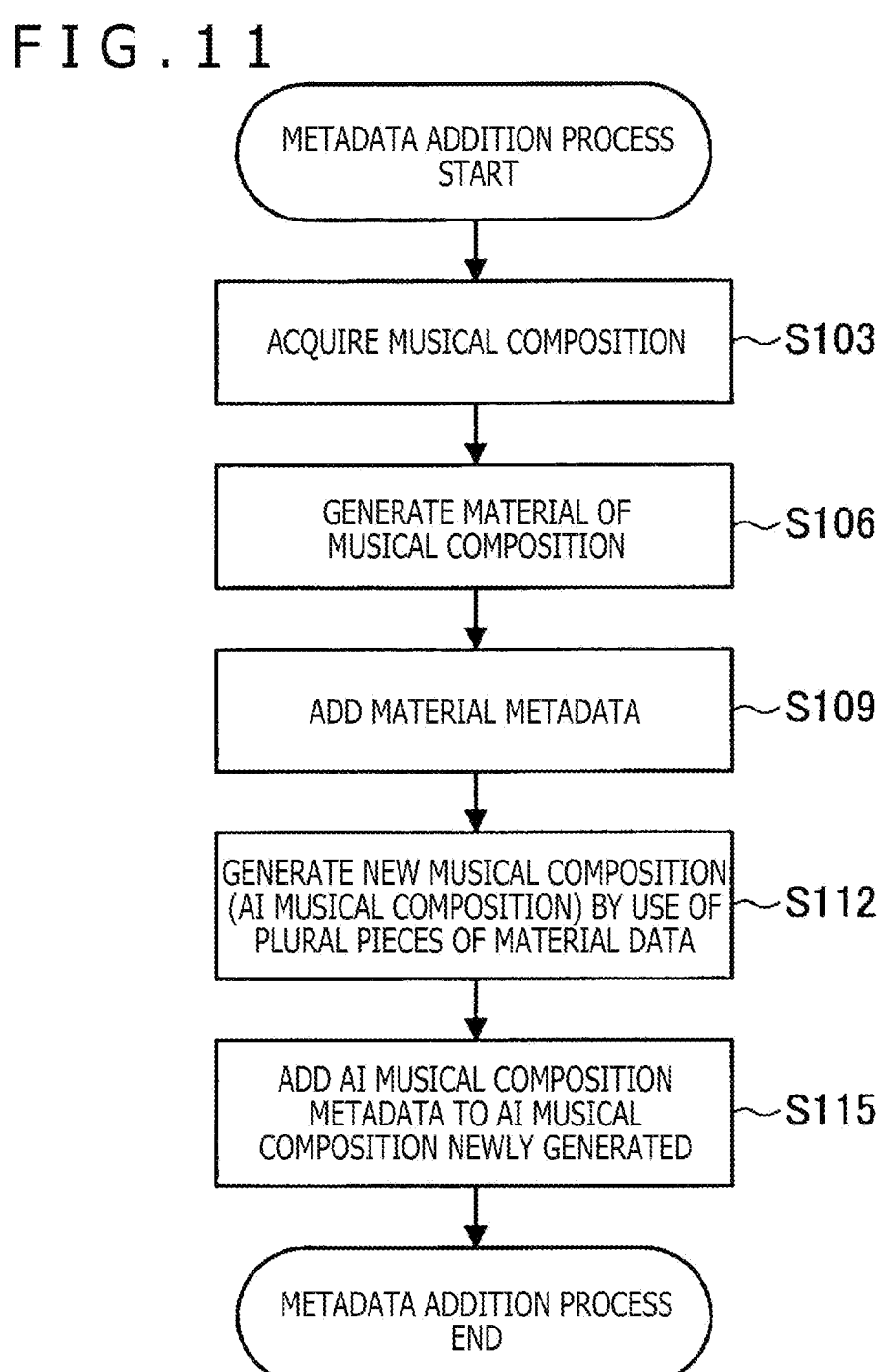

F I G . 1 3

```
        ┌─────────────────────────┐
        │   FEEDBACK PROCESS      │
        │        START            │
        └─────────────────────────┘
                     │
                     ▼
        ┌─────────────────────────┐
        │  ACQUIRE METADATA OF AI │ ── S203
        │   MUSICAL COMPOSITION   │
        └─────────────────────────┘
                     │
                     ▼
        ┌─────────────────────────┐
        │ DETERMINE CONTRIBUTION  │
        │ RATE OF ORIGINAL        │ ── S206
        │ CREATED WORK OR MATERIAL│
        │ DATA TO AI MUSICAL      │
        │ COMPOSITION             │
        └─────────────────────────┘
                     │
                     ▼
                  S209
             ╱─────────────╲
            ╱  MATERIAL DATA ╲       NO
           ╱  HAVING CERTAIN  ╲ ─────────┐
           ╲  INFLUENCE OR MORE╱         │
            ╲  ON AI MUSICAL  ╱          │
             ╲ COMPOSITION   ╱           │
              ╲  PRESENT?   ╱            │
               ╲──────────╱             │
                   │ YES                │
                   ▼                    │
        ┌─────────────────────────┐     │
        │  ACQUIRE AI MUSICAL     │     │
        │  COMPOSITION USE        │── S212
        │  INFORMATION            │     │
        └─────────────────────────┘     │
                   │                    │
                   ▼                    │
        ┌─────────────────────────┐     │
        │   CALCULATE FEEDBACK    │── S215
        └─────────────────────────┘     │
                   │                    │
                   ▼                    │
        ┌─────────────────────────┐     │
        │    PRESENT FEEDBACK     │── S218
        └─────────────────────────┘     │
                   │                    │
                   ◄────────────────────┘
                   ▼
        ┌─────────────────────────┐
        │   FEEDBACK PROCESS      │
        │         END             │
        └─────────────────────────┘
```

F I G . 1 4
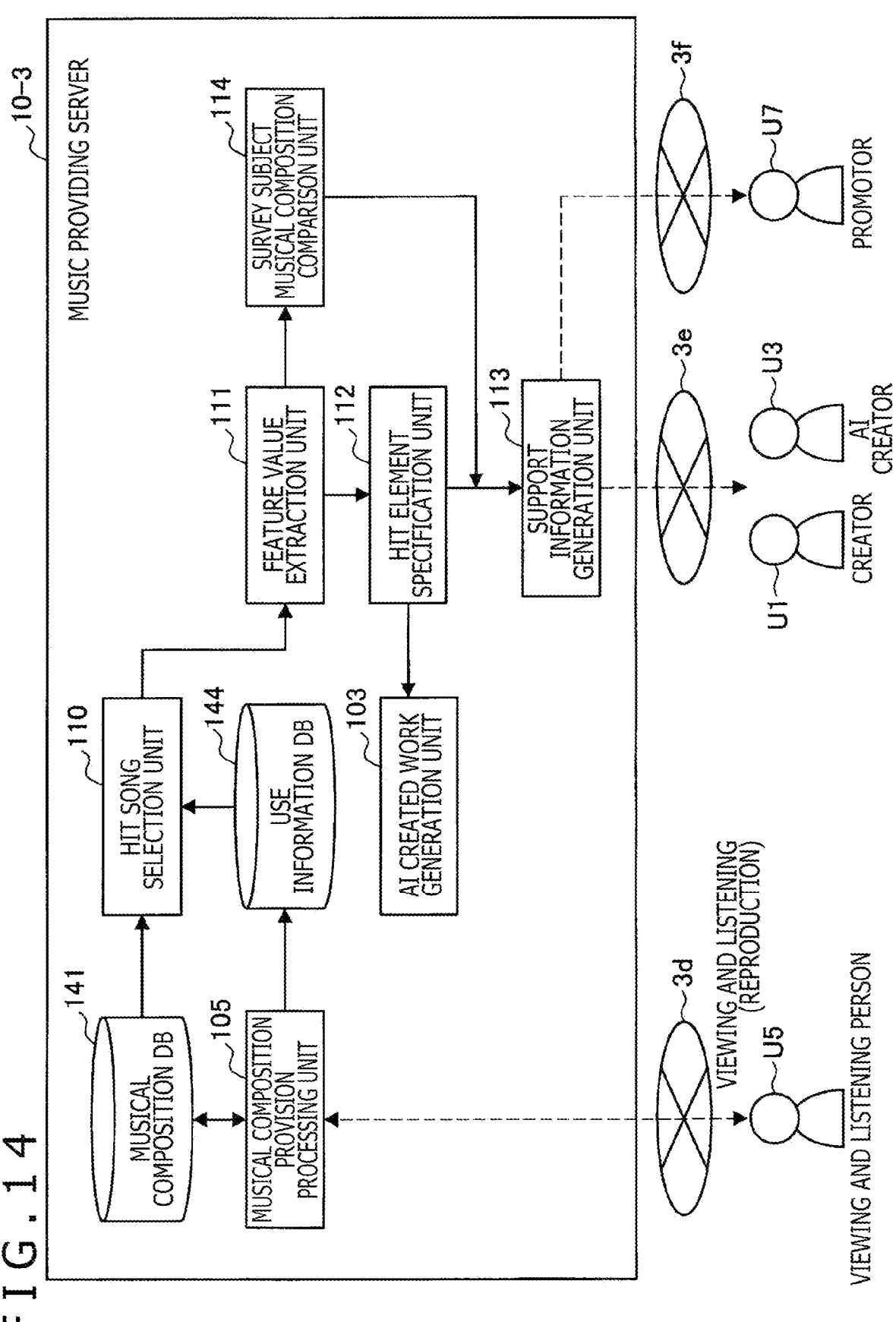

F I G . 1 5
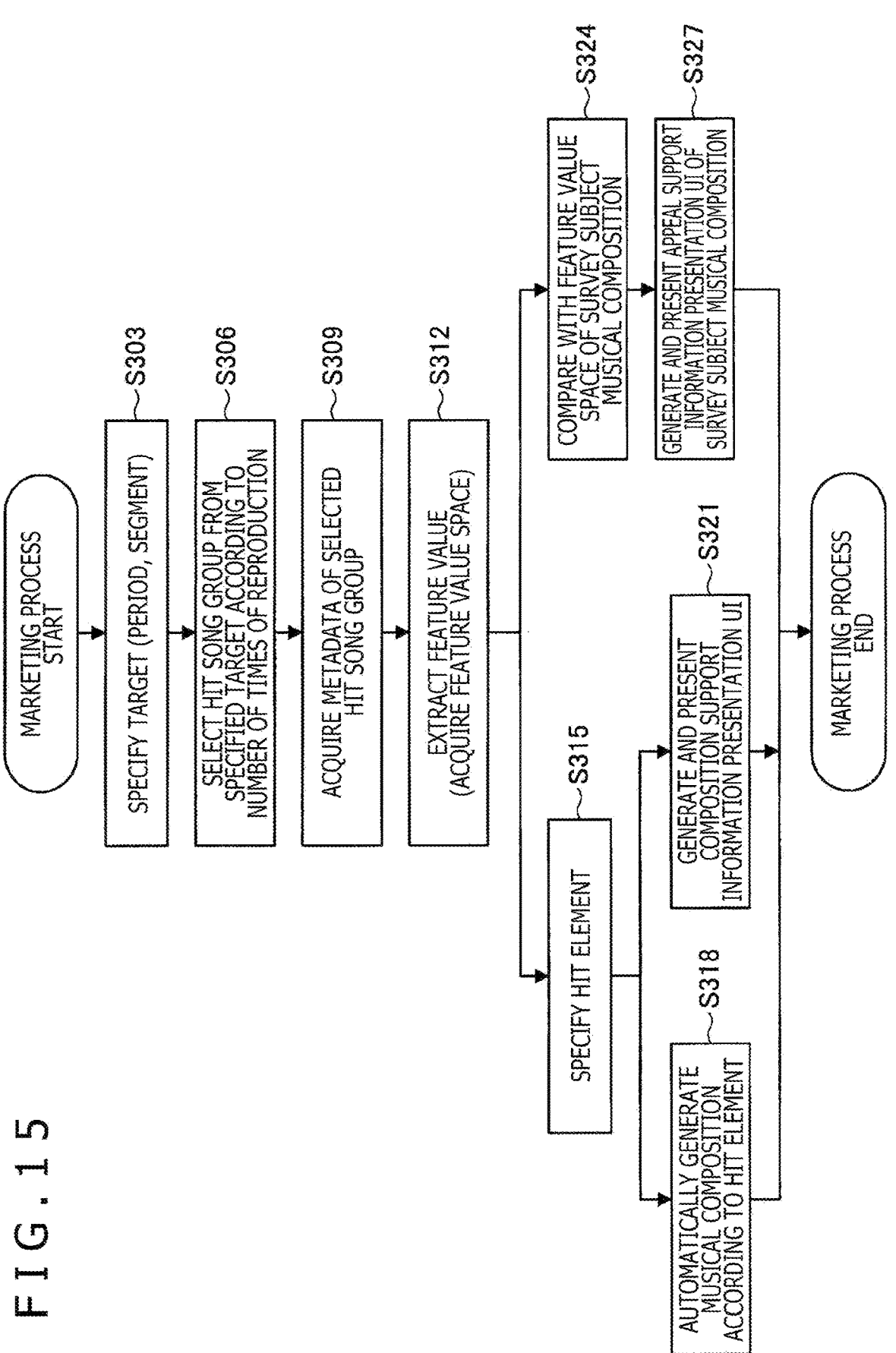

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2020/001075 filed on Jan. 15, 2020, which claims priority benefit of Japanese Patent Application No. JP 2019-009426 filed in the Japan Patent Office on Jan. 23, 2019. Each of the above-referenced applications is hereby incorporated herein by reference in its entirety.

TECHNICAL FIELD

The present disclosure relates to an information processing system, an information processing method, and a program.

BACKGROUND ART

With recent advancement of digitalization of content constituted by images, audio data, or the like, there have been proposed technologies associated with copy protection and copyright management of digital data.

There has also been recently achieved creation from nothing, or creation with reference to plural other created works by utilizing artificial intelligence (hereinafter also referred to as AI).

For example, PTL 1 presented below discloses a method which manages use licenses for users by comparison with a use license range of original content specified beforehand in a case where there is a possibility of copyright infringement decided by reading information associated with content and embedded in original content as digital watermarking or by extracting features of content and comparing the features of the content with features of content already registered.

Moreover, for example, PTL 2 presented below discloses a copyright providing system which promotes secondary use of a copyrighted work while retaining a right to maintain integrity of the copyrighted work by storing work information which includes material data constituting the copyrighted work and citation data identifying other pieces of work information to be cited, treatment data indicating specific treatment processing for the material data of the copyrighted work or other pieces of work information, and use condition data indicating a use condition for work information associated with the copyrighted work.

CITATION LIST

Patent Literature

[PTL 1]
    JP 2001-136363A
[PTL 2]
    JP Hei 10-55389A

SUMMARY

Technical Problems

However, in a case where material data of an original created work decomposed into constituent elements is used for AI creation (generation of content with use of artificial intelligence), it has been difficult to decide, from an AI created work generated as a deliverable (content generated using artificial intelligence), the original created work used at the time of generation of the AI created work, or a relation between the AI created work and the original created work (e.g., a use mode of the original created work for generating the AI created work).

According to PTL 1 described above, a content identifier or a licensed user identifier are embedded in content. However, no description is made concerning information indicating a relation between an original created work and a created work automatically created using AI or the like. Moreover, while PTL 2 described above discloses storage of data such as material data constituting a work, citation data, and treatment data as work information, no consideration is made concerning reference to an original created work of material data used for a created work, and management of generation information associated with creation.

Solution to Problems

Proposed according to the present disclosure is an information processing system including a content generation unit that generates content with use of one or more pieces of material data generated from original content, and a metadata addition unit that adds, to the content, content metadata including material information associated with the material data used for generation of the content and generation information associated with generation of the content.

Proposed according to the present disclosure is an information processing method performed by a processor, the method including generating content with use of one or more pieces of material data generated from original content, and adding, to the content, content metadata including material information associated with the material data used for generation of the content and generation information associated with generation of the content.

Proposed according to the present disclosure is a program causing a computer to function as a content generation unit that generates content with use of one or more pieces of material data generated from original content, and a metadata addition unit that adds, to the content, content metadata including material information associated with the material data used for generation of the content and generation information associated with generation of the content.

BRIEF DESCRIPTION OF DRAWINGS

FIG. 3 is a block diagram depicting an example of a configuration of logic functions according to a first embodiment achieved by a communication unit and a storage unit of the music providing server depicted in FIG. 2.

FIG. 4 is a diagram explaining respective processes performed during an AI creation process in the first embodiment.

FIG. 5 is a diagram explaining a material generation process performed in a case where an original created work is a "musical composition" in the first embodiment.

FIG. 6 is a diagram explaining an example of an AI creation process according to the first embodiment.

FIG. 7 is a diagram explaining another example of the AI creation process according to the first embodiment.

FIG. 8 is a diagram explaining still another example of the AI creation process according to the first embodiment.

FIG. 9 is a diagram explaining yet another example of the AI creation process according to the first embodiment.

FIG. 10 is a diagram explaining a case where metadata is separately managed with ID linkage in a database on a network in the first embodiment.

FIG. 11 is a flowchart presenting an example of a flow of a metadata addition operation process according to the first embodiment.

FIG. 13 is a flowchart presenting an example of a flow of a feedback process according to the second embodiment.

FIG. 14 is a block diagram depicting an example of a configuration of logic functions according to a third embodiment achieved by the communication unit and the storage unit of the music providing server depicted in FIG. 2.

FIG. 15 is a flowchart presenting an example of a flow of a new created work support information presentation process based on hit song analysis in the third embodiment.

DESCRIPTION OF EMBODIMENTS

Figures 1, 2:
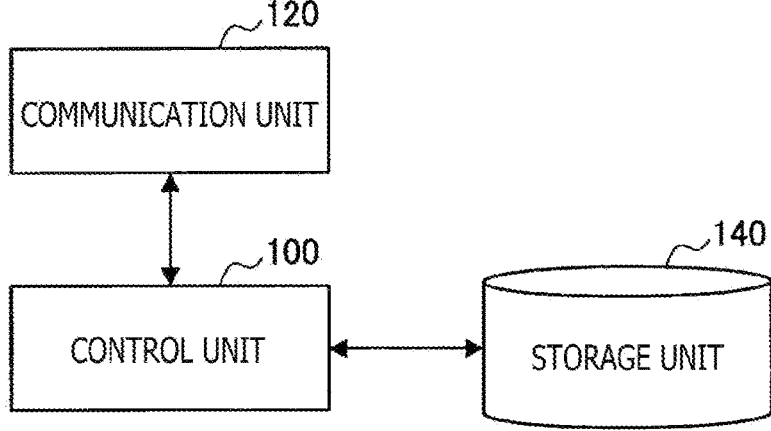
FIG. 1 is a diagram depicting an outline of an information processing system according to one embodiment of the present disclosure.
FIG. 2 is a block diagram depicting an example of a configuration of a music providing server according to the present embodiment.

Preferred embodiments of the present disclosure will be hereinafter described in detail with reference to the accompanying drawings. Note that constituent elements having substantially identical functional configurations in the present description and the drawings are given identical reference signs to omit repetitive description.

In addition, the description will be presented in a following order.

1. Outline of information processing system according to one embodiment of present disclosure
2. Configuration of music providing server 10
3. First embodiment; addition of metadata
3-1. Background
3-2. Functional configuration
3-3. Specific example of generation process and metadata addition
(3-3-1. AI creation process)
(3-3-2. Original creation metadata)
(3-3-3. Material generation process and material metadata)
(3-3-4. AI creation process and AI creation metadata)
[Process example 1: partial element change]
[Process example 1': application of style]
[Process example 2: generation of new element information]
[Process example 3: extraction of style]
[Specific example of AI creation metadata]
(Transfer of CC license and license condition)
(3-3-5. Supplementary description of metadata)
(1) Addition of metadata to existing created work
(2) Management of metadata
(3) Guarantee of authenticity of metadata
(4) Creator information and right holder information
(5) Others
3-4. Operation process
3-5. Advantageous effects
3-6. Other created works
(3-6-1. Novel)
(3-6-2. Movie, video, or game)
(3-6-3. Character (2D/3D))

4. Second embodiment; feedback process
4-1. Background
4-2. Functional configuration
4-3. Operation process
4-4. Advantageous effects
5. Third embodiment; marketing analysis
5-1. Background
5-2. Functional configuration
5-3. Operation process
5-4. Advantageous effects
6. Summary

1. OUTLINE OF INFORMATION PROCESSING SYSTEM ACCORDING TO ONE EMBODIMENT OF PRESENT DISCLOSURE

FIG. 1 is a diagram explaining an outline of an information processing system according to one embodiment of the present disclosure. As depicted in FIG. 1, the information processing system according to the present embodiment includes information processing terminals 20 operated by respective users, and a music providing server 10 communicatively connected with the information processing terminals 20 via a network 3. Each of the information processing terminals 20 transmits and receives data to and from the music providing server 10. Each of the users is allowed to use various functions provided by the music providing server 10 through the information processing terminal 20.

According to the one embodiment of the present disclosure, an AI musical composition is presented as one example of an AI created work. An AI musical composition is a musical composition generated using AI (Artificial Intelligence). An "AI created work" in the present description herein refers to both content automatically created by AI (without human assistance) and content created by a human using AI as a tool (by what is called an AI creator). Moreover, a logic included in "AI" according to the present embodiment is not particularly limited. For example, machine learning is adopted. Further, an algorithm included in machine learning is not particularly limited. For example, linear regression, logistic regression, a decision tree, a neural network, a deep neural network (what is called deep learning), and the like are adoptable.

In addition, while an "AI musical composition" is presented as one example of an "AI created work" in the description of the present embodiment, the "AI created work" in the present disclosure is not limited to the "AI musical composition," but may be applied to various types of content generated using AI (e.g., novel, music, video, game, and 2D/3D character). Details of AI created works other than the AI musical composition will be described below.

The information processing terminal 20 can be implemented in the form of a smartphone, a tablet-type terminal, a cellular phone terminal, a personal computer, a wearable device, or the like. In addition, the information processing terminal 20 includes a control unit (which can be implemented in the form of an electronic circuit such as a CPU (Central Processing Unit) and a microprocessor), a display unit, an operation input unit (e.g., keyboard, mouse, buttons, switches, touch pad, touch panel display, gesture input, and audio input), an audio output unit, and others.

The music providing server 10 provides an AI creation function. For example, AI creation is achieved using material data generated by decomposing an original created work into constituent elements.

In a case where material data obtained by decomposing an original created work into constituent elements is used for AI creation herein, it has been difficult, in the related art, to decide a relation between the original created work and an AI created work thus created.

According to the present embodiment, therefore, a relation between an AI created work and an original created work of material data used for creation of the AI created work can be decided by associating the AI created work with information allowing reference to the original created work, generation information associated with generation of corresponding AI creation, and the like as metadata. In addition, in the present description, metadata added to an AI created work will be referred to as "AI creation metadata," metadata added to material data used for an AI created work will be referred to as "material metadata," and metadata added to an original created work used for generating an AI created work or material data will be referred to as "original creation metadata." Moreover, a general term of these kinds of data will be also simply referred to as "metadata."

Further, the information processing terminal 20 is capable of performing a feedback process for a creator on the basis of AI creation metadata added to an AI created work in such a manner, or performing a marketing process on the basis of AI creation metadata.

A user is allowed to use functions provided by the music providing server 10 to generate a created work with use of AI. Moreover, the user is allowed to receive a distribution of a property benefit from the music providing server 10 when material data generated from a created work created by the user and provided (registered) for the music providing server 10 is used for an AI created work, for example. Further, the user is allowed to enjoy a marketing result analyzed by the music providing server 10 on the basis of AI creation metadata according to a use status of an AI created work.

Details of the respective functions of the music providing server 10 described above will be specifically described in respective following embodiments.

While the respective functions provided by the music providing server 10 as described above are provided by a single server device in the configuration of the example depicted in FIG. 1, these functions of the present disclosure are not required to be provided in this manner. The respective functions described above and provided by the music providing server 10 may be provided by a predetermined platform. In the present description, for example, the "platform" may be a musical composition distribution service system which collects musical compositions and performs user matching or the like to provide a musical composition for the user, a server device which drives an algorithm for implementing a service system and accumulates data, a server device group, a service providing entity, or an entire service ecosystem including the user. For example, a specific system configuration of the platform may include a plurality of servers, or at least some of processes may be executed by software operating in the information processing terminal 20.

2. CONFIGURATION EXAMPLE OF MUSIC PROVIDING SERVER 10

FIG. 2 is a block diagram depicting an example of a configuration of the music providing server 10 according to the present embodiment. As depicted in FIG. 2, the music providing server 10 according to the present embodiment includes a communication unit 120, a control unit 100, and a storage unit 140.

The control unit 100 functions as an arithmetic processor and a controller and controls an overall operation within the music providing server 10 under various programs. For example, the control unit 100 is implemented in the form of an electronic circuit such as a CPU (Central Processing Unit) and a microprocessor. Moreover, the control unit 100 may include a ROM (Read Only Memory) which stores programs to be used, calculation parameters, and the like, and a RAM (Random Access Memory) which temporarily stores parameters and the like variable as appropriate.

Further, the control unit 100 can generate an AI created work, generate material data used for an AI created work, add respective kinds of metadata (AI creation metadata and material metadata) to an AI created work and material data, give feedback to a creator on the basis of AI creation metadata, or perform a marketing process on the basis of AI creation metadata. A specific functional configuration of the music providing server 10 will be described in detail in the respective following embodiments.

The communication unit 120 has a function for communicatively connecting the music providing server 10 and other devices (external devices). For example, the communication unit 120 is implemented in the form of a wired/wireless LAN (Local Area Network), Wi-Fi (registered trademark), Bluetooth (registered trademark), a mobile communication network (LTE (Long Term Evolution), 3G (third generation mobile body communication system)) or the like, and transmits and receives data to and from the information processing terminal 20 or other servers, for example.

The storage unit 140 is constituted by a storage medium such as a semiconductor memory and a hard disk, and stores programs and data for processes performed by the music providing server 10, and content data. For example, data stored in the storage unit 140 can include an AI created work (e.g., AI musical composition), an original created work (e.g., musical composition), material data (e.g., constituent elements of musical composition), and respective kinds of metadata. Note that some or all of programs and data explained in the present description may be acquired from an external data source (e.g., data server, network storage, external memory, or the like) instead of being stored in the storage unit 140.

Subsequently, respective functions provided by the music providing server 10 according to the present embodiment will be specifically described with reference to the drawings in first to third embodiments.

3. FIRST EMBODIMENT; ADDITION OF METADATA

3-1. Background

In AI creation in recent years, a large volume of created works is used in a state of being decomposed into constituent elements as data constituting an origin for AI creation. Accordingly, a distribution of a property benefit according to contribution of an original created work for an AI created work, and visualization of contribution are required. However, it has been difficult to identify an original created work on the basis of a generated AI created work or decide a relation between an AI created work and an original created work (e.g., the part and the manner of use of the original created work).

Accordingly, an information processing system in the first embodiment is characterized by adding, as metadata, information indicating linkage with a used original created work or used material data, right related information, information associated with generation, and the like at the time of generation of material data used for AI creation from an original created work or at the time of generation of an AI created work. Metadata added in such a manner allows later identification of an original created work converted into material on the basis of an AI created work. Utilization of added metadata will be specifically described in the second and third embodiments.

3-2. Functional Configuration

FIG. 3 is a block diagram depicting an example of a configuration of logic functions of the first embodiment achieved by the communication unit 120 and the storage unit 140 of the music providing server 10 depicted in FIG. 2. As depicted in FIG. 3, a music providing server 10-1 according to the first embodiment includes a metadata addition unit 101, a material generation unit 102, an AI created work generation unit 103, a use decision unit 104, a musical composition DB 141, and a material DB 142.

For example, the music providing server 10-1 can operate as a musical composition providing platform and provide an AI creation tool for a user (AI creator or the like).

(1) Musical Composition DB 141

The musical composition DB 141 stores musical composition data as an example of content data. The musical composition data stored in the musical composition DB 141 includes musical composition data created by a creator U1 himself or herself and uploaded via a network 3a, musical composition data distributed by a third party and uploaded, or musical composition data generated by the AI created work generation unit 103 (what is called an AI musical composition).

It is assumed, in the present system, that the creator U1 is an authentic right holder and that a musical composition data is a proper created work (not a suspected infringing product) in a case where this musical composition data is created by the creator U1 himself or herself and uploaded to the music providing server 10-1.

When a distributed created work is registered (i.e., stored in the musical composition DB 141) by a third party, the music providing server 10-1 may decide whether or not registration of the created work in the musical composition DB 141 is allowed, or whether or not use of the created work is allowed within the platform (i.e., the present system) after deciding whether the created work is a proper created work and is not a suspected infringing product, for example.

(2) Material DB 142

The material DB 142 stores material data which can be used for generation of an AI created work (e.g., data obtained by decomposing a musical composition into constituent elements). Material data stored in the material DB 142 may be provided by a creator or a third party, or may be generated by the material generation unit 102.

When distributed material data is registered by a third party, the music providing server 10-1 may decide whether or not registration of the material data in the material DB 142 is allowed, or whether or not use of the created work is allowed within the platform (i.e., the present system) after deciding whether the created work is a proper created work and is not a suspected infringing product, for example, in a manner similar to the above.

(3) Material Generation Unit 102

The material generation unit 102 generates material data by decomposing a musical composition (created work) accumulated in the musical composition DB 141 into constituent elements. The generated material data is accumulated in the material DB 142 and used at the time of generation of an AI musical composition (AI created work) by the AI created work generation unit 103. Details of a material data generation process (i.e., material generation process) will be described below. In the present description, a created work constituting an origin of material data used for generation of an AI created work in such a manner will be also referred to as an "original created work."

(4) Metadata Addition Unit 101

The metadata addition unit 101 performs a process for adding, as metadata, information allowing identification of an original created work or material data (material information), right related information, information associated with generation (generation information), and the like to generated material data or AI created work. The generation information includes use modes of an original created work or material, generation methods such as rules and algorithms used for AI creation, and the like. Details of the meta data addition process will be described below.

(5) AI Created Work Generation Unit 103

The AI created work generation unit 103 generates, with use of material data, an AI created work by AI. The AI created work generation unit 103 may function as a tool used when a human (AI creator U3 or the like) generates an AI created work (what is called an AI creation tool), or may generate an AI created work by itself. An algorithm used for an AI created work generation process is not particularly limited. Various types of algorithm are applicable to the AI created work generation unit 103. A specific AI creation processing example will be described below.

Note that the AI created work generation unit 103 may generate an AI created work with use of not only material data generated by decomposing a created work into constituent elements, but also with use of a created work itself. Moreover, the AI created work generation unit 103 may generate, using AI, material data available for generating other AI created works. Material data generated by AI is an example of an AI created work and will be referred to as "AI material data" in the present description.

Moreover, the AI created work generation unit 103 prohibits use of an original created work or material data decided to be unavailable according to a use decision result obtained by the use decision unit 104.

(6) Use Decision Unit 104

The use decision unit 104 decides whether or not an original created work or material data can be used for AI creation on the basis of respective pieces of metadata added to the original created work or the material data. For example, the use decision unit 104 decides that use of the original created work or the material data for AI creation is not allowed in a case where suspicion as an infringing product, an unknown right state, no permission of use for AI creation (secondary use in a wide sense), and the like are added to the original created work or the material data as metadata.

Moreover, in a case where a use license condition (an example of "right license information") is set as metadata, the use decision unit 104 decides, according to a use mode of an original created work or material data for AI creation, whether or not the original created work or the material data can be used for AI creation. For example, the use license condition can be set by a right related person (e.g., author and copyright holder) beforehand. For example, the use license condition may be a CC license (creative commons license) defined by Creative Commons. In a case where the use mode of the original created work or the material data for AI creation meets the use license condition, the use decision unit 104 decides that use is allowed.

Use of an original created work or material data which may cause a problem when used for AI creation, such as a suspected infringing product, is avoidable by deciding, by the use decision unit 104, whether or not an original created work or material data can be used for AI creation.

The functional configuration of the music providing server 10-1 according to the present embodiment has been described above. Note that the functional configuration described above is not required to be implemented by the single device (music providing server 10-1), but may be implemented by plural devices. In other words, the functional configuration depicted in FIG. 3 may be considered as a system configuration constituted by plural devices. For example, all of respective processes performed by the metadata addition unit 101, the material generation unit 102, the AI created work generation unit 103, and the use decision unit 104 are not required to be achieved by the music providing server 10-1, but may be individually achieved by other devices (e.g., a server, or the information processing terminal 20 used by the user).

3-3. Specific Example of Generation Process and Metadata Addition

Subsequently, respective generation processes performed in the present embodiment and a specific example of metadata addition will be described in detail with reference to the drawings.

(3-3-1. AI Creation Process)

FIG. 4 is a diagram explaining respective processes performed in the present embodiment in an AI creation process. As depicted in FIG. 4, the information processing system of the present embodiment achieves "AI creation" which executes an AI creation process S3 for generating an AI created work by the AI created work generation unit 103 with use of material data, and an AI creation metadata addition process S4 performed by the metadata addition unit 101.

A logic used for the AI creation process is not particularly limited. For example, the AI creation process can be performed using machine learning (specifically, selection and application of a learning model or the like) as described above.

The metadata addition unit 101 adds "information allowing identification of original material data (e.g., reference ID)," a "learning process (generation information associated with generation details of an AI created work, such as a use mode of corresponding material data for AI creation)," and the like as AI creation metadata, on the basis of material metadata added to material data used for AI creation.

By performing the AI creation metadata addition process for "AI creation" in such a manner in the present embodiment, feedback to a right related person of an original created work is achievable according to contribution of the original created work to an AI created work at the time of later distribution of a property benefit of the AI created work or the like after visualization of the contribution of the original created work to the AI created work. The feedback based on AI creation metadata will be specifically described in a second embodiment.

Moreover, a process performed by the material generation unit 102 for generating material data from an original created work (material generation process S1), and an original creation metadata addition process S2 performed by the metadata addition unit 101 can be executed as a "preprocessing" for the "AI creation." According to the present embodiment, on an assumption that metadata indicating right related information or the like associated with an original created work (original creation metadata) has been added to the original created work beforehand, the metadata addition unit 101 adds "information allowing identification of the original created work (e.g., reference ID)," "information indicating which type of an element constituting the material in the original created work (i.e., details of the material generation process), or the like as material metadata, on the basis of the original creation metadata added to the original created work.

Moreover, "postprocessing" of "AI creation" may be executed. The "postprocessing" is not an essential processing. For example, a recursive process such as adjustment made by a human for the AI created work generated by the AI creation process S3, and an AI creation process again performed on the basis of the generated AI created work may be performed as postprocessing.

(3-3-2. Original Creation Metadata)

First, a specific example of original creation metadata added to an original created work beforehand will be described. Note that following description will be presented in the present embodiment on an assumption that the original creation metadata has been added to the original created work beforehand. However, this configuration is not necessarily required to be adopted. The metadata addition unit 101 may add (additionally give) the original creation metadata to the original created work.

In a case where the original created work is a "musical composition," it is considered that music bibliographic information, right holder information, right license information, and the like are added as original creation metadata, for example.

Specific examples of the "music bibliographic information," the "right holder information," and the "right license information" added as original creation metadata will be hereinafter presented. Data presented hereinafter by way of example is given only as one example, and each of the information is not necessarily required to include all of the data of the example.

First, an example of the music bibliographic information will be presented in following Table 1.

TABLE 1

| MUSIC BIBLIOGRAPHIC INFORMATION | DATA |
| --- | --- |
| TITLE | xxxx |
| ARTIST NAME 1 | xxxx |
| (e.g., GROUP NAME) | |
| ARTIST NAME 2 | xxxx, xxxx, xxxx |
| (e.g., MEMBER NAME) | |
| MUSIC CATEGORY | xxxx, xxxx |
| PUBLISHER | xxxx |
| DATE OF PUBLICATION | yyyymmdd |
| . . . | . . . |

In a case where plural artist names or the like are included, plural pieces of data may be added.

A plurality of categories may be labelled as a music category.

Moreover, in a case where information such as a music category is acquirable with reference to an existing DB (e.g., a music store provided by an enterprise), the metadata addition unit 101 may add (additionally gives) that information. Alternatively, the metadata addition unit 101 may determine and add a music category by machine learning.

Note that the metadata addition unit 101 may process unknown data as blank data when adding metadata.

(Right Holder Information)

An example of the right holder information will be presented in following Table 2. In the present description herein, terms such as an "author" and a "copyright holder" are used as one example of the "right holder," and terms such as a "copyright" and a "divisible right (e.g., a reproduction right, a publishing right, an adaptation right, and a right associated with use of a derivative copyrighted work)" are used as one example of the "right." However, these terms are not limited to terms each indicating a state where a legal right is produced in a strict sense. For example, the "copyright" may be produced on the basis of a state considered by the present platform or a service provider, a type uniquely defined, a right protection state, a license state, or the like.

TABLE 2

| RIGHT HOLDER INFORMATION | DATA |
| --- | --- |
| AUTHOR: COMPOSER | xxxx |
| AUTHOR: LYRIC WRITER | xxxx |
| AUTHOR: ARRANGER | xxxx |
| . . . | . . . |
| RIGHT HOLDER: PUBLISHER | xxxx, xxxx |
| RIGHT HOLDER: ADAPTATION RIGHT | xxxx, |
| RIGHT HOLDER: OTHER RIGHTS | |
| . . . | . . . |

The author information may be retained while classified for each contribution mode (e.g., composition, lyrics, and arrangement). By retaining a musical composition classified for each mode, information indicating an associated right holder can be extracted as AI creation metadata at the time of use of the corresponding musical composition in a form of being decomposed into constituent elements (specifically, used after generated as material data). For example, in a case where only a music element of the corresponding musical composition is used for AI creation, a "composer" and an "arranger" can be decided as associated right holders and extracted as AI creation metadata by the metadata addition unit 101.

The copyright holder information may be set for each of divisible rights (e.g., a reproduction right, a publishing right, an adaptation right, and a right associated with use of a derivative copyrighted work). Moreover, the copyright holder information may be set in conjunction with a time stamp indicating a time at which the copyright holder information is obtained. Information associated with the right holder information and the time stamp is updated each time an attribution of the right changes. For example, the right holder information may be managed in a DB of a managing company managing the musical composition or the like and be associated as reference information. In a case where the right holder information is managed by a person, a DB of the information management may be associated as reference information. Accuracy of the copyright type differs for each country. Accordingly, the right information may be set as an information block of a corresponding divisible right. Moreover, in a case where a corresponding divisible right is absent, a data region indicating "others" may be provided to set the right information in this data region.

Moreover, in a case where reference to a DB of a predetermined copyright management organization (e.g., a database included in a right management organization server 30 depicted in FIG. 3) is allowed, for example, the metadata addition unit 101 may acquire right holder information from the DB of the copyright management organization on the basis of a music bibliography such as a title of a musical composition and add (additionally give) the right holder information to the musical composition as original creation metadata. Moreover, information acquired from the DB of the copyright management organization may be handled as an estimated value (because information registered in the DB of the copyright management organization is not necessarily authentic).

Further, in a case where an original created work is a derivative created work or a derivative copyrighted work, it is assumed that information presented in following Table 3 is added as right holder information associated with a derivative created work or a derivative copyrighted work (referred to as a derivative creator or a derivative author, respectively). The "derivative copyrighted work" herein is a new copyrighted work created with adaptation such as translation, arrangement, deformation, and dramatization of an original copyrighted work (created with dependence on the original copyrighted work) in the present description. Moreover, the "derivative created work" is assumed to include a wide range of a new created work created at a low level of dependence in comparison with the "derivative copyrighted work" but created with any idea obtained from the original copyrighted work (original created work) (influenced by the original copyrighted work at a certain level) in the present description. The fact that the original created work is a derivative created work or a derivative copyrighted work can be included in the original creation metadata beforehand.

TABLE 3

| RIGHT HOLDER INFORMATION (DERIVATIVE CREATED WORK OR DERIVATIVE COPYRIGHT WORK) | DATA |
| --- | --- |
| DERIVATIVE CREATOR OR DERIVATIVE AUTOR: COMPOSER | xxxx |
| DERIVATIVE CREATOR OR DERIVATIVE AUTOR: LYRIC WRITER | xxxx |
| DERIVATIVE CREATOR OR DERIVATIVE AUTOR: ARRANGER | xxxx |
| . . . | . . . |

In a case where the corresponding original created work is a derivative created work or a derivative copyrighted work, information associated with the original copyrighted work (author information and copyright holder information indicated in Table 2 presented above) may be added, or only information allowing identification of the original copyrighted work (e.g., reference ID) is assumed to be added.

While respective types of information associated with an author and a copyright holder have been listed above as the "right holder information," these are not limited to information associated with a "copyright holder" or an "author" in a legally strict sense as described above, but may be information associated with a person or an associated person registered under a rule set by a platformer (a provider, a manager, an operator or the like of the platform), or a creator or an associated person considered applicable by the platform. Moreover, for example, account information associated with a content registerer may be added as the right holder information.

An example of the right license information will be subsequently presented in following Table 4.

TABLE 4

| RIGHT LICENSE INFORMATION | DATA |
| --- | --- |
| CREATED WORK TYPE | xxxx |
| RIGHT PROTECTION STATE | xxxx |
| USE LICENSE INFORMATION | xxxx |
| RIGHT INFRINGEMENT FLAG | xx |
| . . . | |

For example, following types are assumed as created work types. Note that the following types each include "AI creation" considering a case where an original created work is an AI created work.

(a) Human creation: a type of created work newly created by a human (b) Human derivative creation: a type of created work newly created by a human on the basis of an idea obtained from an original copyrighted work (corresponding to the above-described "derivative created work" in the present description)

(c) Human derivative creation: a type of created work newly created by a human with dependence on an original copyrighted work (corresponding to the above-described "derivative copyrighted work" in the present description)

(d) AI creation type 1: a type of created work newly created by a human using AI as a tool, including a human as an author or a copyright holder (e) AI creation type 2: a type of created work created by AI only without contribution to creation by a human. For example, a case where an output of a random frequency composition or data constituting an origin of learning is prepared by a human but creation based on the above-described preparation is performed by AI only, is assumed. In this case, a human author is considered to be absent, but a human copyright holder may be assumed to be present because whether or not a copyright is produced may differ for each country or for each era (for example, a provider of an AI creation tool is considered to be a copyright holder).

(f) AI derivative creation: a type of created work newly created by a human using AI as a tool, or by AI only, on the basis of an idea obtained from an original copyrighted work (corresponding to the above-described "derivative created work" in the present description)

(g) AI derivative type creation: a type of created work newly created by a human using AI as a tool, or by AI only, with dependence on an original copyrighted work (corresponding to the above-described "derivative copyrighted work" in the present description)

(h) unknown: a case where a type of created work is unknown

For example, the types of created work described above may be used for a right processing performed later. Moreover, the types of created work may be added as original creation metadata beforehand, or may be added by the metadata addition unit 101 after acquired from a predetermined DB where information associated with the types of created work is accumulated.

Moreover, for example, following states are assumed as a right protection state.

(a) Public domain (b) CC license (BY/SA/NC/ND): creative commons license. Types of these are described on the basis of declaration by the right holder. Note that the types of creative commons license include "BY," "SA," "NC," and "ND," and types defined in other manners.

(c) Conditional license: a record indicating condition details may be separately added.

(d) Unknown

The right protection state may be set for each so-called divisible right of a copyright law or for each similar right. In that case, reference information for divisible right information is added.

Moreover, availability for derivative creation or a derivative copyrighted work is particularly indicated as the use license state. Information indicating the use license state may be declared by an author having a right to maintain integrity, or a copyright holder having a right associated with use of a derivative copyrighted work. Alternatively, in a case where the right protection state is a CC license and in a conditioned license state, reference to information indicating a use license state may be made.

Moreover, a right infringement flag is a flag given in a case of suspicion of infringement caused by a corresponding created work. For example, the right infringement flag is given on the basis of a notification from a user, an infringement exposure by AI (e.g., decision whether an infringement is present on the basis of similarity or dissimilarity of a feature of a created work to a created work registered beforehand), a decision by a platformer distributing the corresponding created work (e.g., system manager), or the like.

The right states of the "right protection state," the "use license information," and the "right infringement flag" described above are each not required to be a legal state in a strict sense, but may be a state considered applicable by the platform (e.g., service provider), or a state uniquely defined.

(3-3-3. Material Generation Process and Material Metadata)

Next, a material generation process performed by the material generation unit 102 and addition of material metadata by the metadata addition unit 101 will be described.

(1) Material Generation Process

The material generation unit 102 generates material data by decomposing constituent elements of an original created work. The generated material metadata is accumulated in the material DB 142.

Figure 5:
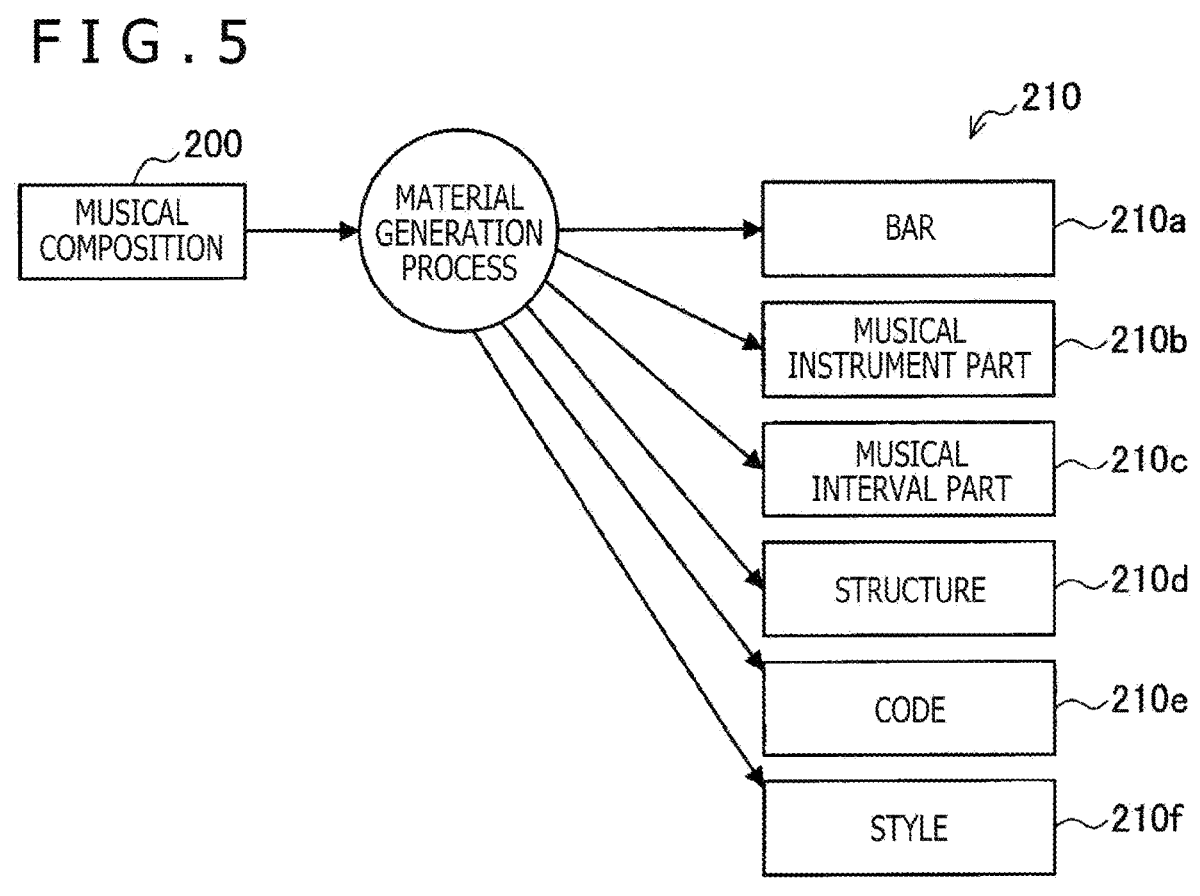

The material generation process performed in a case where an original created work is a "musical composition" will be described by way of example with reference to FIG. 5. FIG. 5 is a diagram explaining the material generation process performed in the case where the original created work is a "musical composition."

As depicted in FIG. 5, for example, the material generation process for a musical composition achieves decomposition into respective music elements 210 constituting a musical composition 200 (bars 210a (range information), respective musical instrument parts 210b (sound quality information), respective musical interval parts 210c (constituent element information), a structure 210d (constituent element information), codes 210e (abstract element information), and a style 210f (abstract element information), and others).

The "bar" is an example of music decomposed in a range in a time direction and may indicate the range with use of a time stamp, for example. The "structure" is configuration information in the time direction, such as "first verse, second verse, chorus, and first verse." In addition, the musical interval parts constitute configuration information in a music space direction. Extraction of the style may be represented by a group of certain feature values on the basis of AI learning.

The generated material data may be a minimum unit as depicted in FIG. 5, a plurality of combinations of the minimum unit, or abstracted predetermined unit information.

Note that the musical composition element decomposition explained with reference to FIG. 5 is presented only by way of example, and the present embodiment is not limited to this decomposition.

(2) Material Metadata

For example, the metadata addition unit 101 adds following information to generated material data as material metadata. The metadata addition unit 101 can add the material metadata to each piece of material data generated from an original created work by using original creation metadata added to the original created work beforehand.

(a) Information allowing identification of the original created work (information for uniquely identifying the original created work by using a reference ID or a combination of plural pieces of information)

(b) Information indicating which element type of material included in the original created work is used or the like (information associated with generation details) (i.e., information indicating how the material is generated, or information indicating what material is used as the corresponding material)

(c) Right related information (information relating to a creator and a right holder, or a right license, both in a case where right holder information or license information associated with the original created work is transferred without change, and in a case where only a corresponding part is transferred)

An example of material metadata according to the present embodiment will be presented in following Table 5.

TABLE 5

| MATERIAL METADATA | MEANING OF ITEM |
| --- | --- |
| MATERIAL ID | INFORMATION ASSOCIATED WITH MATERIAL AS TARGET OF CORRESPONDING METADATA |
| ORIGINAL CREATED WORK INFORMATION | INFORMATION ALLOWING UNIQUE IDENTIFICATION OF ORIGINAL CREATED WORK |
| ORIGINAL CREATED WORK REFERENCE ID | ADD ID INFORMATION IF REFERENCE TO ORIGINAL CREATED WORK IS ALLOWED BY ID OR LIKE |
| ORIGINAL CREATED WORK NAME | |
| ORIGINAL CREATED WORK TYPE | WHETHER OR NOT GENUINE CONTENT, UGC (User Generated Content), OR LIKE |
| ORIGINAL CREATED WORK SOURCE | WHERE ORIGINAL CREATED WORK HAS BEEN ACQUIRED (REGULAR PURCHASE, DB CITATION, PROVIDED BY PLATFORM, OR LIKE) |
| MATERIAL GENERATION INFORMATION | |
| MATERIAL TYPE | e.g., WHICH OF BAR, MUSICAL INSTRUMENT, MUSICAL INTERVAL, STYLE, AND OTHERS (OR WHICH TYPE RANGE INFORMATION) |
| MATERIAL GENERATION RANGE | DESCRIBE IN CASE WHERE INFORMATION ASSOCIATED WITH TIME RANGE OR MUSICAL INSTRUMENT TYPE IS PRESENT) |
| MATERIAL PROCESSOR INFORMATION | PERSON (OR TOOL, PLATFORM) HAVING PERFORMED MATERIAL GENERATION PROCESS (INFORMATION MAY INCLUDE MATERIAL GENERATION TIME INFORMATION OR LIKE) |
| CREATOR OR RIGHT HOLDER INFORMATION | INFORMATION ASSOCIATED WITH RIGHT HOLDER RELATING TO CORRESPONDING MATERIAL PART FOR ORIGINAL CREATED WORK |
| RIGHT LICENSE INFORMATION | INFORMATION ASSOCIATED WITH RIGHT RELATING TO CORRESPONDING TO MATERIAL PART FOR ORIGINAL CREATED WORK |
| USER DEFINITION INFORMATION | INFORMATION UNIQUELY DESIRED TO BE STORED BY OTHER USERS (OR TOOLS) IS STORED HERE IF ANY |

Material metadata may be added to each minimum unit as depicted in FIG. 5. However, in a case where material data is constituted by a combination of plural units, material metadata may be added in units of this combination.

(3-3-4. AI Creation Process and AI Creation Metadata)

Next, an AI creation process performed by the AI created work generation unit 103 and addition of AI creation metadata by the metadata addition unit 101 will be described.

First, several processing examples of AI creation and AI creation metadata addition will be touched upon.

Process Example 1

Partial Element Change (1) AI Creation

FIG. 6 is a diagram explaining an AI creation processing example according to the present embodiment. As depicted in FIG. 6, the AI created work generation unit 103 can generate a new musical composition (AI musical composition 220) with use of AI (e.g., machine learning) on the basis of respective material data (bars 210*a*, musical instrument parts 210*b*, musical interval parts 210*c*, and codes 210*d*) generated from a certain musical composition, for example.

At this time, the AI created work generation unit 103 can generate an AI musical composition by changing a part of element information constituting the musical composition in one example. According to the example depicted in FIG. 6, a new AI musical composition is generated by changing the "codes" of the element information constituting the musical composition.

Which element information is changed in what manner may be designated by a human (e.g., AI creator U3), or may be automatically decided by the AI created work generation unit 103. For example, the AI created work generation unit 103 is capable of changing the codes into codes uniquely generated by machine learning or the like, or into codes generated from another musical composition by performing the material generation process. Moreover, the AI created work generation unit 103 may modify original constituent elements of a change target by machine learning or the like.

A process for decomposing a musical composition into element information to generate material data, and a process for generating an AI musical composition on the basis of the generated material data may be performed in a series of flows. Specifically, at the time of generation of an AI musical composition based on a musical composition selected by the AI creator U3, or selected uniquely by AI, for example, respective music elements may be extracted (i.e., material data may be generated) by initially performing the material generation process using the material generation unit 102 for decomposition of the corresponding musical composition, and then an AI musical composition may be generated using the AI created work generation unit 103.

(2) Addition of AI Creation Metadata

The metadata addition unit 101 adds information such as "what combination of material data has been used (information allowing identification of used material data (e.g., reference ID))" and "what element information has been changed for an original musical composition (e.g., use mode of material data)" to a generated AI created work (AI musical composition) as AI creation metadata (AI musical composition metadata).

The information added to the generated AI created work, as AI creation metadata, to identify the used material data or the like in such a manner is useful for calculation of contribution of the original created work to the AI created work at the time of distribution of a property benefit of the AI created work or the like in the second embodiment described below. Specifically, the original created work of the used material data and the use mode of the material data are recognizable from the AI creation metadata. Accordingly, the property benefit or the like of the corresponding AI created work can be fed back to the right related person of the original created work as appropriate.

Process Example 1'

Application of Style (1) AI Creation

Moreover, a method which allocates a different style to a certain musical composition is adoptable as another method of AI musical composition generation by the AI created work generation unit 103.

FIG. 7 is a diagram explaining another AI creation processing example according to the present embodiment. As depicted in FIG. 7, for example, the AI created work generation unit 103 generates a new AI musical composition 222 which has a different style 214*e* as the style of the musical composition 200 changed on the basis of the musical composition 200 and the style 214*e*. In this manner, for example, a musical composition styled after a different artist can be generated by changing a musical composition of a certain artist to a style of the different artist.

(2) Addition of AI Creation Metadata

The metadata addition unit 101 adds information allowing identification of a used musical composition (e.g., reference ID), information indicating an adopted style (i.e., information allowing identification of used material data), and the like to the generated AI musical composition 222 as AI creation metadata.

In this manner, appropriate calculation can be achieved, such as subtraction of a style from an original musical composition and addition of contribution of a right related person of the adopted style at the time of calculation of contribution of an original created work to an AI created work for distribution of a property benefit of the AI created work, for example, in the second embodiment described below.

Process Example 2

Generation of New Element Information (1) AI Creation

Moreover, the AI created work generation unit 103 is capable of newly generating new element information used for AI creation or the like (i.e., material data) as an AI created work by using a combination of plural pieces of element information, machine learning, or others. Material data generated by the AI created work generation unit 103 will be referred to as "AI material data" in the present description.

FIG. 8 is a diagram explaining another AI creation processing example according to the present embodiment. As depicted in FIG. 8, for example, the AI created work generation unit 103 is capable of generating a new AI bar 224 (AI material data) by using a combination of respective pieces of element data obtained by extracting bar parts each having a certain length from plural pieces of music (e.g., a bar 210*a*, a bar 211*a*, a bar 212*a*, and a bar 213*a* each generated by extracting a bar part having a certain length from each of plural musical compositions by the material generation process).

Selection or a manner of combination of material data may be designated by a human, or may be automatically decided by the AI created work generation unit 103.

(2) Addition of AI Creation Metadata

For example, the metadata addition unit 101 adds information, such as "information allowing identification of used material data (e.g., reference ID)" and "a methodology of generation (e.g., combination method and learning method)," to generated new AI material data as AI material metadata.

In this manner, identification of plural pieces of material data corresponding to a generation source of AI material data used for an AI created work, and further identification of respective original created works of the plural pieces of material data are achievable at the time of calculation of contribution of the original created works to the AI created work for distribution of a property benefit of the AI created work, for example, in the second embodiment described below. Accordingly, the material data and right related persons of the original created works can be appropriately recognized.

Process Example 3

Extraction of Style (1) AI Creation

Moreover, the AI created work generation unit 103 is capable of extracting feature value information included in plural original created works (or element information associated with these) as common items and generating new element information (AI material data), on the basis of the plural original created works (or element information associated with these).

FIG. 9 is a diagram explaining another AI creation processing example according to the present embodiment. As depicted in FIG. 9, the AI created work generation unit 103 can extract feature value information (e.g., tone, scale, and rhythm pattern) included in plural musical compositions 200A to 200D as common items and generate a style 226 on the basis of the musical compositions 200A to 200D. In this manner, a creation style allowed to be called an "artist B style" can be generated as AI material data on the basis of plural musical compositions of an artist B, for example.

Extraction of the style is not required to be executed from a viewpoint of an artist, but may be achieved from various viewpoints, such as extraction from a plurality of viewpoints like a certain category or age of a certain artist, style extraction in a certain age, and style extraction of women artists in a certain age.

(2) Addition of AI Creation Metadata

For example, the metadata addition unit 101 adds "information allowing identification of plural used created works (e.g., reference ID)," "information associated with viewpoints for extraction of feature values," and others to generated AI material data as AI material metadata.

In this manner, identification of a plurality of original created works corresponding to a generation source of AI material data used for an AI created work (e.g., "style") is achievable at the time of calculation of contribution of an original created work to the AI created work for distribution of a property benefit of the AI created work, for example, in the second embodiment described below. Accordingly, a right related person of the original created work can be appropriately recognized.

The processing examples of AI creation and AI creation metadata addition have been described above. Next, a further specific example of AI creation metadata added to an AI created work will be described.

[Specific Example of AI Creation Metadata]

Following Table 6 presents a specific example of AI creation metadata added to an AI created work.

TABLE 6

| AI CREATION METADATA | MEANING OF ITEM |
| --- | --- |
| BIBLIOGRAPHIC INFORMATION | INFORMATION EQUIVALENT TO MUSIC BIBLIOGRAPHY OF ORIGINAL CREATED WORK |
| CREATOR OR RIGHT HOLDER INFORMATION | RIGHT HOLDER INFORMATION DIRECTLY ASSOCIATED WITH CORRESPONDING AI CREATED WORK |
| RIGHT LICENSE INFORMATION | RIGHT HOLDER INFORMATION ASSOCIATED WITH CORRESPONDING AI CREATED WORK |
| ORIGINAL CREATED WORK INFORMATION | INFORMATION FOR IDENTIFYING USED ORIGINAL CREATED WORK |
| ORIGINAL MATERIAL INFORMATION | INFORMATION FOR IDENTIFYING USED ORIGINAL MATERIAL |
| USER DEFINITION INFORMATION | |

In Table 6 described above, details equivalent to music bibliographic data described above with reference to Table 1 (e.g., title, artist name, and music category), for example, are assumed in "bibliographic information." In a case of an AI created work created by AI only, a name of an AI tool or a tool manager name may be added, or a predetermined artist name defined by a person using an AI tool (e.g., imaginary artist name) may be added to the "artist name."

Moreover, details equivalent to right holder information described with reference to Table 2 (e.g., author and copyright holder) are assumed in "creator or right holder information." Contribution rate information corresponding to a use type of an original created work or original material data may be further added in association with each creator or right holder.

Further, "right license information" refers to details equivalent to right license information associated with an original created work described with reference to Table 4 (e.g., created work type, right protection state, and use license information). The right license information may be decided on the basis of license information associated with an original created work or material data. For example, the metadata addition unit 101 may transfer a CC license or a license condition of an original created work or material data when adding AI creation metadata to a generated AI created work. Specific transfer of a CC license and a license condition will be hereinafter described by way of example.

(Transfer of CC License and License Condition)

The metadata addition unit 101 needs to transfer a CC license or a license condition added to an original created work or material data also to an AI created work depending on the type of the CC license or the license condition. In this manner, for example, the metadata addition unit 101 achieves a process prohibiting use for AI creation as material, or a process only using an available part of an original created work or material data in a case where the original created work or the material data corresponds to a derivative created work of another created work.

Further, the metadata addition unit 101 may decide transfer of a CC license, a license condition, or the like of an original created work or material data according to a contribution level of the original created work or the material data to an AI created work. For example, the metadata addition unit 101 may transfer a condition of an original created work or material data only in a case where an AI created work depends on an original created work to such an extent that the AI created work is decided to be recognizable as a derivative copyrighted work. An algorithm used for derivative copyrighted work decision is not particularly limited. A work may be decided as a "derivative copyrighted work" not only in a case of a legal derivative copyrighted work in a strict sense, but also in a case of a state considered applicable by the platform or agreement with a condition uniquely defined.

In addition, the metadata addition unit 101 may transfer a condition limited to a part corresponding to large contribution to an AI created work. For example, a CC license or the like of an original created work or material data may be transferred to only a bar part of an AI musical composition.

Moreover, the metadata addition unit 101 may transfer right license information associated with an original created work or material data in a case where an AI created work which is not a derivative copyrighted work but is decided to be influenced by the original created work or the material data to a certain extent. A decision criterion for the "influence to a certain extent" is not particularly limited. For example, a criterion lower than a criterion for decision as a derivative copyrighted work can be assumed.

(3-3-5. Supplementary Description of Metadata)

(1) Addition of Metadata to Existing Created Work

The metadata addition unit 101 is also capable of adding metadata to an existing created work. The existing created work is assumed to be a distributed created work registered by a third party, a created work registered by an authentic right holder, or the like. As described above, these created works each correspond to an original created work decomposed into constituent elements by the material generation process and then used for AI creation by the AI created work generation unit 103.

Specifically, for example, the metadata addition unit 101 can refer to an opened musical composition database or refer to information provided from an authentic right holder or a copyright management organization to add original creation metadata to a musical composition registered in the musical composition DB 141 by the user. This addition of the original creation metadata may be performed under permission by an authentic right holder or the like. As described above, it is also considered that only original creation metadata added under permission by an authentic right holder or the like is distributed as authenticated information. Moreover, also considered is a service which distributes a database of generated material data, and material metadata added to the material data by using only a material generation process for generating material data from an existing created work.

Further, in a case where metadata is not added to an original created work or material data used for an AI created work, the metadata addition unit 101 may add metadata to these original created work or material data at timing of use for an AI created work in an allowable range with reference to an opened database or the like as described above.

A metadata addition process according to the present embodiment may be performed by the metadata addition unit 101 (i.e., as one of AI creation support services operating on the platform), or may be included in an AI creation tool distributed to the user (i.e., an application operating in the information processing terminal 20 used by the user and having a material generation processing function or an AI created work generation function).

(2) Management of Metadata

The pieces of metadata may be presented in the form of a package and each added to content of an original created work, material data, an AI created work, or the like.

Alternatively, only an ID for identifying corresponding metadata may be added to content, while metadata may be managed in a database on the network separately from the content in a form of being associated with the corresponding ID. FIG. 10 is a diagram depicting a case where metadata is separately managed with ID linkage of metadata in a database on the network according to the present embodiment.

As depicted in FIG. 10, for example, each metadata is managed by a database on the network, such as a metadata management server 40, and only an ID for identifying corresponding metadata is added to each content (musical composition, material data, and AI musical composition). For example, a metadata addition unit 101a generates AI musical composition metadata for an AI musical composition generated by an AI created work generation unit 103a with reference to respective pieces of metadata (musical composition metadata (original creation metadata), material metadata) managed by the metadata management server 40 on the basis of an ID added to a used musical composition (original created work) or material data, and uploads the generated AI musical composition metadata to the metadata management server 40, and further adds only an ID of the AI musical composition metadata to the AI musical composition.

In such a manner, associated metadata can be separately managed by ID linkage with use of a database server or the like without the necessity of adding metadata itself to content.

Such management of metadata is achievable by a predetermined copyright management organization, an organization providing a metadata management service, or a platformer.

(3) Guarantee of authenticity of metadata

According to the present embodiment, for example, metadata authenticity can be guaranteed by management of an adder of original creation metadata or with use of a blockchain (distributed management ledger technology). This point will be hereinafter specifically described.

Management of Adder of Original Creation Metadata

For example, in a case where an adder of original creation metadata is an end user, authenticity of the metadata can be guaranteed by management of the adder achieved by associating account information indicating the adder with original creation metadata, allowing only an account of true name registration to add original creation metadata, or allowing access to an editing history of the original creation metadata.

Moreover, for example, authenticity of the metadata can be guaranteed by management of the adder achieved by providing a mechanism which notifies a service provider or a metadata manager in the present system of original creation metadata suspected not to be authentic information.

Use of Blockchain

Further, alteration prevention of metadata can be guaranteed by managing metadata with use of a blockchain (distributed management ledger technology). A blockchain, which is an example of a distributed type system, is a technology capable of securing credibility by mutual monitoring of data without the necessity of a server unlike a centralized system. Specifically, for example, authenticity can be strictly maintained using metadata information (ledger) shared by plural business persons (respective information processing apparatuses).

At this time, registration of copyright information and the like in a blockchain (addition of original creation metadata) may be executed by a qualified management organization. Note that this registration may be dispersedly performed by plural qualified management organizations (e.g., certified music publishers). Moreover, in addition to the above, the end user may add original creation metadata (e.g., copyright information) to an original created work. In that case, distinction between the qualified management organization, a person equivalent to the management organization, and the end user may be recorded as the adder of the original creation metadata. Note that the original creation metadata may be handled as an estimated value in a case where the adder of the original creation metadata is the end user.

(4) Creator Information and Right Holder Information

Creator information or right holder information added as metadata is not limited to information in a strict legal state such as a copyright law.

According to the present disclosure, an author or a copyright holder in a copyright law may be managed, or information associated with a person relating to a created work in a wide sense in addition to legal rights such as a copyright law is managed. For example, information associated with a person relating to a created work includes an account through which a created work is submitted and self-reported creator information, information associated with a "creator," an "owner," or a "right holder" uniquely defined by the platform, and the like.

Moreover, according to the present disclosure, a use mode not corresponding to "use" and "use for a derivative copyrighted work" in a copyright law is also a management target in a wide sense. For example, simple reference to an original created work, or reference in a case of a loss of copyrightability of an original created work (e.g., a case where an original created work is excessively subdivided and used in units of one note) in an extreme sense may be considered as "use" of the original created work.

(5) Others

According to the present embodiment, "material data" used by the AI created work generation unit 103 for the AI creation process includes not only data generated through the "material generation process" which decomposes and extracts an original created work such as a completed musical composition, but also data generated as material data from start.

For example, distribution of only a drum part as one package, or creation and distribution of only a phrase of five bars (or melody included therein) is also assumed. Accordingly, such a type of sound source generated as material data from start can also be included in "material data" used at the time of generation of an AI musical composition.

Further, an original creation metadata may be automatically added by a creation application or the like in a creation process of an original created work. For example, in a case where plural persons create a musical composition through a session, metadata of a creator (right related person) may be added for each material generated each time in a production process of the musical composition. In this manner, the creator of the material included in the complete musical composition is automatically included in the metadata of the complete musical composition as creator information at the time of completion of the musical composition. This addition of metadata during the production process may be automatically carried out by tracking of a music production tool.

3-4. Operation Process

Subsequently, a metadata addition operation process performed in the present embodiment will be described with reference to FIG. 11. FIG. 11 is a flowchart presenting an example of a flow of the metadata addition operation process according to the present embodiment. A "musical composition" is adopted herein as an example of a created work.

As presented in FIG. 11, the material generation unit 102 first acquires a musical composition corresponding to an original created work from the musical composition DB 141 (step S103) and performs a material generation process (step S106).

Subsequently, the metadata addition unit 101 adds information identifying the original created work, right related information, and the like as material metadata to the generated material data (step S109).

Thereafter, the AI created work generation unit 103 generates a new musical composition (AI musical composition) with use of plural pieces of material data (step S112).

Then, the metadata addition unit 101 adds information identifying used material data, right related information, and the like as AI musical composition metadata to the newly generated AI musical composition (step S115).

The flow of the operation process according to the present embodiment has been described above. The respective pieces of metadata may be generated and added at timing of the respective processes. While the operation process which generates an AI created work with use of plural pieces of material data generated through the material generation process and adds AI creation metadata has been described herein by way of example, the present embodiment is not limited to this example. An AI created work may be generated on the basis of material data and an original created work or may be generated using material data generated as material from start without being subjected to the material generation process. Moreover, a new AI created work may be generated by changing a part of constituent element information associated with an original created work.

3-5. Advantageous Effects

According to the first embodiment, contribution of an original created work to an AI created work can be visualized by adding AI creation metadata to the AI created work. In this manner, accurate recognition of a right related person of an original created work, and appropriate feedback according to contribution of the original created work are achievable at the time of distribution of a property benefit of the AI created work, for example, in the second embodiment described next.

Particularly in a case where a large volume of original created works is used for AI creation, right relations can also be easily organized.

3-6. Other Created Works

According to the first embodiment described above, the "musical composition (music)" has been adopted as an example of an AI created work (content). However, the present embodiment is not limited to this example and may be applied to other types of content, such as a novel, a movie, a video, a game, and a character (2D, 3D). In any of these cases, the material generation process and the AI created work generation process described in the present embodiment can be performed. Specific examples will be hereinafter touched upon.

(3-6-1. Novel)

A "novel" constituted by text data is considered as an example of a created work. For example, material data generated as constituent elements of the "novel" includes a "plot," "main characters," "world view setting," "items to appear," a "literary style," and others.

The "plot" is an outline of a scenario (e.g., event and development). For example, a story flows in a following manner. "A main character helped some person. The main character was invited by the person to some place as a gratitude and did something. Thereafter, the main character returned and turned into something."

For example, the "main character" is feature information such as character settings, lines of the character, a habit of answering, and the like.

The "literary style" is what is called a "style" which represents phrasing, expressions, and the like peculiar to a novelist and gives an impression that the novel is written by the novelist.

The AI created work generation unit 103 is capable of generating a new novel (AI created work) by using material data described above or combining the material data. Specifically, for example, the AI created work generation unit 103 is capable of automatically generating a story which does not collapse or a story which becomes popular among targets of the corresponding work by following a plot of a trend novel or a hit novel. Moreover, the AI created work generation unit 103 is capable of generating a new novel by using information (material data) associated with an eccentric main character, a character of a type likely to become popular among readers, or others. Further, the AI created work generation unit 103 is capable of generating a parody work which gives an impression that the novel has been written by a certain novelist by using the "literary style" of the corresponding novelist.

(3-6-2. Movie, Video, or Game)

Moreover, a "movie, a video, or a game" is considered as an example of a created work. For example, material data generated as constituent elements of these includes a "plot," "scenes," "actions of characters or actors," "camera work," "world view setting," "properties to appear," a "direction," and others.

The AI created work generation unit 103 is capable of generating a new "movie, video, or game" (AI created work) by using material data described above, or combining the material data. Specifically, for example, the AI created work generation unit 103 is capable of combining characteristic scenes and actions, scene development, and the like (material data), generating new "scenes" as AI material data through machine learning or the like by using these characteristic scenes, actions, scene development, or the like, and generating a new movie as an AI created work.

(3-6-3. Character (2D/3D))

Further, a "character (2D or 3D)" (image data) is considered as an example of a created work. For example, material data generated as constituent elements of these include "physical status or framework information," "clothing and fashion, and items," a "style of drawings," and others. Moreover, in addition to these, dynamic information indicating "actions" and "behaviors" peculiar to corresponding characters, and inner information such as a "emotion model" and a "character model," and others.

The AI created work generation unit 103 is capable of generating a new "character" by using material data described above or by combining the material data. Specifically, for example, the AI created work generation unit 103 can generate a new character by combining respective pieces of material data generated from a large number of existing characters. Moreover, for example, the AI created work generation unit 103 is capable of completing a new character by changing a part of constituent elements of a character newly generated from nothing or by adding constituent elements.

Specific examples other than music have been described above. Note that respective pieces of material data are not limited to data generated from an original created work, but may be data generated as material data from start (e.g., scenario setting information, character information, and CG data).

4. SECOND EMBODIMENT; FEEDBACK PROCESS

A second embodiment according to the present disclosure will be subsequently described. According to the present embodiment, more appropriate feedback to a right related person of an original created work or material data is achieved, on the basis of AI creation metadata added to an AI created work.

4-1. Background

As described above, in a case where material data or the like obtained by decomposing an original created work into constituent elements is used for AI creation, it has been difficult to decide, on the basis of a generated AI created work, the original created work and a relation between the generated AI created work and the original created work.

According to the present embodiment, therefore, an original created work used for AI creation is clarified, and, by using AI creation metadata (see first embodiment) added to an AI created work, more appropriate feedback to a right related person of the original created work is achievable.

4-2. Functional Configuration

Figure 12:
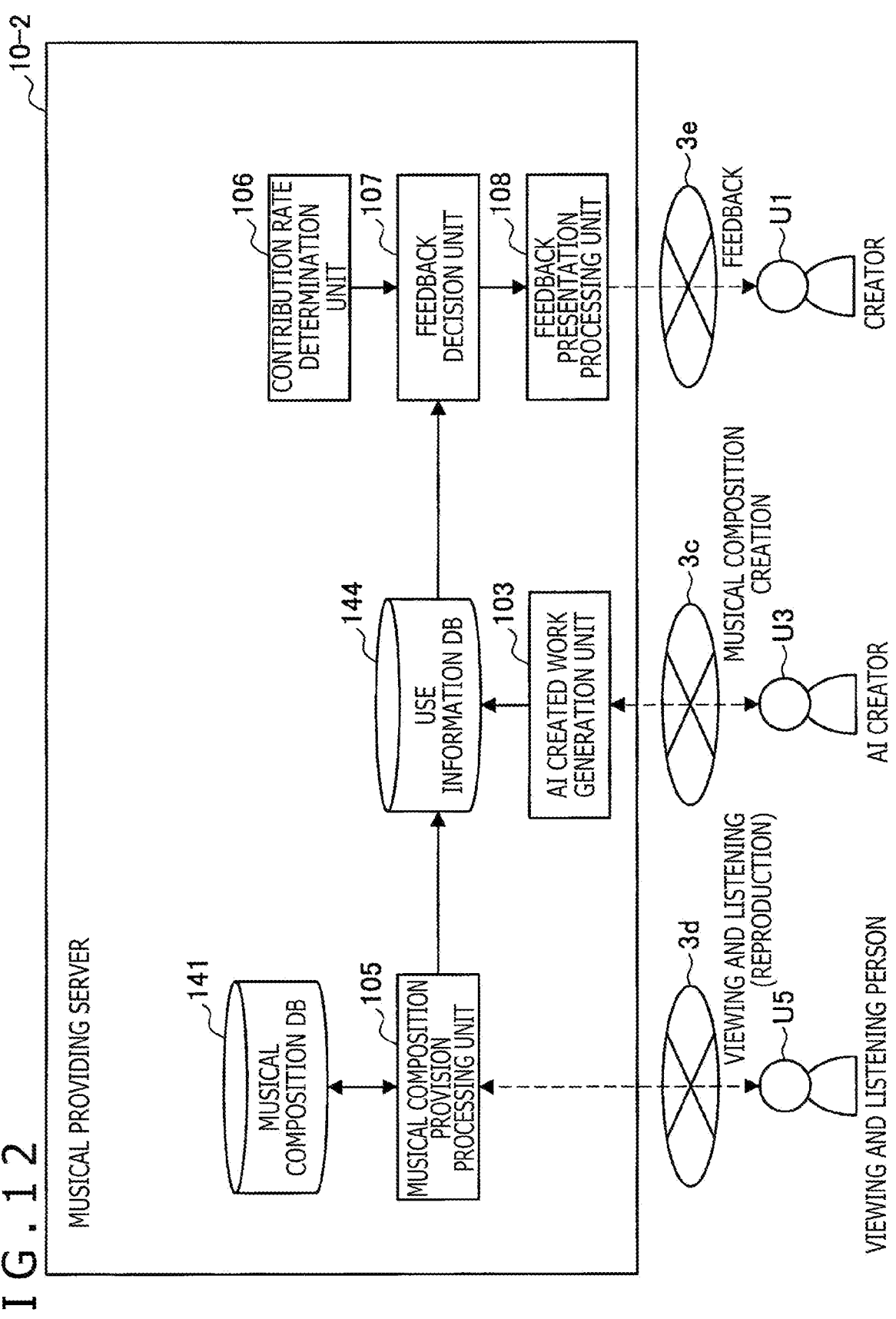
FIG. 12 is a block diagram depicting an example of a configuration of logic functions according to a second embodiment achieved by the communication unit and the storage unit of the music providing server depicted in FIG. 2.

FIG. 12 is a block diagram depicting an example of a configuration of logic functions according to the second embodiment achieved by the communication unit 120 and the storage unit 140 of the music providing server 10 depicted in FIG. 2. As depicted in FIG. 12, the material generation unit 102 according to the second embodiment includes the AI created work generation unit 103, a musical composition provision processing unit 105, a contribution rate determination unit 106, a feedback decision unit 107, a feedback presentation processing unit 108, the musical composition DB 141, and a use information DB 144. While a "musical composition" is adopted as an example of a created work, the present embodiment is not limited to this example and may be applied to another type of created work (e.g., novel, game, video, and character).

(1) Musical Composition Provision Processing Unit 105

The musical composition provision processing unit 105 performs a process for providing a musical composition for a viewing and listening person U5. The "provision" of the musical composition herein is provision of viewing and listening. A musical composition stored in the musical composition DB 141 is distributed to the information processing terminal 20 of the user by streaming distribution, download distribution, or the like via a network 3d such that the musical composition can be reproduced on the information processing terminal 20 of the user, for example. The musical composition DB 141 can also include an AI musical composition generated by the AI created work generation unit 103. Moreover, the musical composition provision processing unit 105 accumulates the number of times of reproduction of each of musical compositions (including AI musical composition) in the use information DB 144 as use information.

(2) Use Information DB 144

The use information DB 144 accumulates information associated with use of respective musical compositions, such as the number of times of reproduction of each of the musical compositions. The "use" is not limited to "reproduction" (distribution), but can include a case of use at the time of generation of a new AI musical composition or AI material using the AI created work generation unit 103. In a case of use of a musical composition (including AI musical composition) for AI creation, the AI created work generation unit 103 accumulates corresponding use information in the use information DB 144.

While accumulation of use information in a case of use of a "musical composition" as one example of an AI created work is described in the present embodiment, an AI created work is not limited to a "musical composition" as described above, but may be a novel, a movie, a video, a game, a character, or the like. Each piece of use information can similarly be accumulated in these cases. For example, the use information is assumed to be the number of page views or downloads in a case of a "novel," the number of times of reproduction in a case of a "movie or video," the number of times of play and the number of downloads in a case of a "game," the number of downloads in a case of a "character," or others.

Moreover, in a case where money (sales) is produced by use, money information is also accumulated in the use information DB 144.

(3) Contribution Rate Determination Unit 106

The contribution rate determination unit 106 determines a contribution rate of an original created work or material data to an AI musical composition on the basis of AI musical composition metadata added to the AI musical composition. According to the present description, the "contribution rate" refers to information (contribution information) indicating a degree of contribution of an original created work as a material generation source of material data used at the time of generation of an AI created work such as an AI musical composition, or material data (data generated as material data from start) to the AI created work (a degree of use of the original created work or the material data for the AI created work).

It is assumed that a property benefit such as money, electronic money, and points equivalent to money, an evaluation, or the like is produced as a result of use of an AI created work (e.g., viewing and listening of the AI musical composition, and use as material at the time of generation of another AI musical composition). Accordingly, it is desirable to give appropriate feedback of the property benefit, the evaluation, or the like of the AI created work to a right related person of an original created work or material data used for the AI created work as material. According to the present embodiment, a use mode or a right related person of original creation or material data used as material is identified on the basis of AI creation metadata added to an AI created work, and a contribution rate of the original creation or the material data is determined. Accordingly, appropriate feedback to the right related person is achievable.

A specific example of contribution rate determination made by the contribution rate determination unit 106 will be hereinafter described.

A case of an AI musical composition generated by the "process example 1: partial element change" described in the first embodiment will be described by way of example. The contribution rate determination unit 106 recognizes an original created work used and a use mode on the basis of AI musical composition metadata and determines a contribution rate of a right related person of an original created work (a degree of contribution of the right related person with respect to the entire AI created work), at the time of determination of the contribution rate of the original created work of the generated AI musical composition. According to the process example 1, the AI musical composition is generated by changing a part of elements of the original created work. Accordingly, the contribution rate determination unit 106 reduces contribution of the right related person associated with the changed element information (e.g., author and copyright holder). For example, in a case where a musical instrument part of a used original musical composition is changed, contribution of a player of the corresponding musical instrument is absent. Moreover, in a case where a certain bar is switched to a bar of another piece of music, for example, contribution of a proportion of the changed bar is reduced. However, this change of contribution may be weighted according to a degree of importance of the changed bar for the entire musical composition. For example, the change amount of contribution may be varied according to whether or not the changed bar falls within a chorus part.

Moreover, for example, in a case of an AI musical composition generated by the "process example 1': application of style" described in the first embodiment, the contribution rate determination unit 106 subtracts a style lost from an original musical composition and adds contribution of a right related person of an applied style (or a right related person associated with the style of the musical composition corresponding to the generation source of the applied style).

Further, for example, in a case where a property benefit is produced by using AI material data (an example of an AI created work) generated by the "process example 2: generation of new element information" described in the first embodiment as material for generating another AI created work, for example, the contribution rate determination unit 106 similarly determines a contribution rate of an original created work or material data on the basis of added AI creation metadata. For example, in a case where element information constituting a part of a musical composition, such as a new AI bar, is generated on the basis of plural musical compositions or plural pieces of material data, the contribution rate determination unit 106 may obtain a contribution rate by division into equal parts by the number of used musical compositions, or may obtain a contribution rate corresponding to a degree of an influence in a case where a degree of an influence of each of musical compositions (e.g., a length of melody used for an AI bar) is known.

In addition, for example, in a case where a property benefit is produced by using AI material data "style" generated by the "process example 3: extraction of style" described in the first embodiment as material for generating another AI created work, for example, the contribution rate determination unit 106 similarly determines a contribution rate of an original created work or material data on the basis of added AI creation metadata. For example, the contribution rate determination unit 106 may obtain equal parts divided by the number of plural used musical compositions, or determine the contribution rate according to a degree of an influence in a case where a degree of an influence of each of the musical compositions is known. Moreover, the contribution rate determination unit 106 may weight contribution in view of style extraction (e.g., "artist") (in this case, relative reduction of contribution rates of other elements is made).

Note that the plural processes described above or the like are combined and recursively processed to generate an AI created work in some cases. Accordingly, contribution rates of respective created original works or pieces of material data can be calculated in consideration of these treating processes.

Moreover, in a case where an original created work or material data is a derivative created work, the contribution rate determination unit 106 may also determine a contribute rate of an original created work on which the derivative created work depends (hereinafter referred to as an "original created work"). The contribution rate determination unit 106 can calculate contribution of a right related person of each of created works on the basis of which of a created part of an original created work or a created part of a derivative created work has been used for an AI created work. For example, the contribution rate determination unit 106 does not set a contribution rate for an original created work in a case where only a part corresponding to a difference of a derivative created work from the original created work is used for an AI created work.

Moreover, the contribution rate determination unit 106 may determine a contribution rate on the basis of a weight corresponding to a degree of importance of a used part with respect to an entire AI created work. For example, the contribution rate determination unit 106 may decide that a chorus part or a part that is unique compared to other created works (less similar part) is an important part and set a higher degree of importance for this part than other parts, and then determine a contribution rate in consideration of a weight corresponding to this degree of importance. The important part may be decided according to a degree of repetitive appearance of the corresponding element, or marketing analysis based on whether or not configurational importance is expectable (e.g., an element corresponding to a "chorus" is expected to be important in a configuration of "first verse, second verse, and chorus") or based on a use status of an AI created work.

While a specific example of determination of a contribution rate has been described above, determination of a contribution rate is not limited to precise calculation, but may be only approximate calculation, or determination of a contribution rate of a main original created work (e.g., calculation of a percentage of a certain original created work in entire original created works used for generation of an AI created work).

(4) Feedback Decision Unit 107

The feedback decision unit 107 decides a distribution (feedback) of a property benefit or the like of an AI created work for a right related person of each original created work or each piece of material data of the AI created work according to a contribution rate determined by the contribution rate determination unit 106.

Feedback may be given to right related persons of all original created works or material data according to contribution rates, or only to right related persons of original created works or material data each having a certain influence or more on an AI created work (used at a certain rate or more). For example, in a case where an original created work is referred to during generation of an AI created work but only has an influence reduced to a level substantially ignorable in a generation process, feedback is not given to the right related person of the corresponding original created work.

Moreover, in a case where an original created work having an influence but not used enough to be considered to produce a derivative created work, feedback may be omitted.

In such a manner, whether to give feedback may be decided by comparison between a contribution rate and a predetermined threshold.

Followings are examples of a distribution as feedback.

Money, electronic money, points equivalent to money

Points distributed only in a platform (the present system), and predetermined values defined by the platform (the present system) (fed back according to accumulation of use and a contribution degree)

Presentation of UI as public recognition indicating use exceeding a fixed level (This is feedback for representing the number of times or a particular use mode according to these. For example, in a case where "a created code is used by another person ten times," feedback indicating this fact is given to a creator.)

Presentation of the fact that an original created work or material data is used (In this case, presentation may differ for each use mode. For example, in a case where an AI created work is generated, "derivative creation xxx has been produced" is presented. In a case where an AI created work is influenced at a certain level, "creation xxx is influenced" is presented. In a case where reference is made without producing contribution to an AI created work, "used" is presented.)

Moreover, as a feedback mode, ranking display may be presented according to an actual situation of generation of an AI created work or derivative use by other persons for a created work or material data of a user. The ranking display may be presented using user names, or may be ranking display of original created works or material data frequently used. Further, presentation indicating a segment where material data or a created work of the user is particularly used may be made. In this manner, the user is capable of recognizing a more visualized use mode of material data or a created work of the user. Accordingly, a creative urge can be guaranteed.

(5) Feedback Presentation Processing Unit 108

The feedback presentation processing unit 108 gives feedback presentation to a user (creator U1 or the like who is a right related person of an original created work or material data) on the basis of a decision result obtained by the feedback decision unit 107. Examples of the feedback presentation include giving money, electronic data, and points equivalent to money, giving non-money incentive, notification of use information, and others.

The functional configuration of the material generation unit 102 of the present embodiment has been described above. Note that the functional configuration described above is not required to be implemented by the single device (material generation unit 102), but may be implemented by plural devices. In other words, the functional configuration depicted in FIG. 12 may be considered as a system configuration constituted by plural devices.

4-3. Operation Process

Subsequently, an operation process performed in the present embodiment will be described with reference to FIG. 13. FIG. 13 is a flowchart presenting an example of a flow of the feedback process according to the second embodiment. A "musical composition" is adopted herein as an example of a created work.

First, the contribution rate determination unit 106 of the material generation unit 102 acquires metadata of an AI musical composition (AI musical composition metadata) (step S203) and determines a contribution rate of an original created work or material data to the AI musical composition.

Subsequently, the feedback decision unit 107 decides whether or not the original created work or the material data has a certain influence or more on the AI musical composition on the basis of the contribution rate of the original created work or the material data (step S209). For example, the feedback decision unit 107 may set a predetermined threshold and decide whether or not an original created work or material data having a contribution rate exceeding the predetermined threshold is present.

Thereafter, the feedback decision unit 107 acquires use information associated with the AI musical composition from the use information DB 144 (step S212).

Then, the feedback decision unit 107 calculates feedback (distribution) to the original created work or the material data according to the use information associated with the AI created work and the contribution rate of the original created work or the material data to the AI created work (step S215). For example, in a case where a property benefit is distributed as feedback, the feedback decision unit 107 alculates a property benefit to be distributed to each original created work or each piece of material data according to a property benefit based on the use information of the AI created work and on the contribution rate of the original created work or the material data.

Thereafter, the feedback presentation processing unit 108 gives feedback presentation (e.g., money giving process) to a right related person of the original created work or the material data (step S218).

The operation process according to the present embodiment has been described above. Note that described herein by way of example has been the operation process in the case where feedback is presented only to the right related person of the original created work or the material data having a certain influence or more on the AI created work. However, the present embodiment is not limited to this example. As described above, feedback presentation may be given to right related persons of all original created works or material data.

4-4. Advantageous Effects

According to the second embodiment, a use mode of an original created work or material data used for an AI created work can be clarified using AI creation metadata added to the AI created work, and appropriate feedback to a right related person of the original created work or the material data can be achieved.

5. THIRD EMBODIMENT: MARKETING ANALYSIS

A third embodiment according to the present disclosure will be subsequently described. According to the present embodiment, more effective marketing analysis is achieved on the basis of AI creation metadata added to an AI created work to support a new created work.

5-1. Background

In the related art, it has been known to analyze hit factors of musical compositions, novels, or the like and provide further supports. However, only analysis in units of musical composition, such as artist factors (e.g., personality and voice quality), promotion factors, and music categories (e.g., latest trend categories) is executed, and more detailed musical composition analysis, specifically, analysis for each element constituting a created work has been difficult to perform.

According to the present embodiment, however, more detailed analysis (e.g., analysis of an original created work or material data used for an AI created work) is achievable by using metadata added to a created work (particularly AI creation metadata added to the AI created work described in the first embodiment).

A support system of a new created work achieved by analysis of a created work based on metadata according to the present embodiment will be described hereinbelow. A "musical composition" is presented herein as an example of a created work. Needless to say, application of the support system according to the present embodiment is not limited to the "musical composition," but may be other created works (e.g., novel, game, video, and character).

5-2. Functional Configuration

FIG. 14 is a block diagram depicting an example of a configuration of logic functions according to a third embodiment achieved by the communication unit 120 and the storage unit 140 of the music providing server 10 depicted in FIG. 2. As depicted in FIG. 14, the AI created work generation unit 103 according to the third embodiment includes the AI created work generation unit 103, the musical composition provision processing unit 105, a hit song selection unit 110, a feature value extraction unit 111, a hit element specification unit 112, a support information generation unit 113, a survey subject musical composition comparison unit 114, the musical composition DB 141, and the use information DB 144.

(Hit Song Selection Unit 110)

The hit song selection unit 110 selects hit songs from the musical composition DB 141. The definition of hit songs is not particularly limited. For example, the hit song selection unit 110 may decide that a musical composition reproduced more than a predetermined number of times in a predetermined user segment (user layer such as age and gender) for a predetermined period is a hit song with reference to the use information DB 144.

(Feature Value Extraction Unit 111)

The feature value extraction unit 111 extracts respective feature values of musical compositions selected as hit songs. Specifically, the feature value extraction unit 111 can extract, as feature values, element information (material data) constituting the selected musical compositions on the basis of metadata added to the selected musical compositions (e.g., AI musical composition metadata added to the AI musical compositions). For example, the feature value extraction unit 111 is capable of extracting musical elements constituting the AI musical compositions such as bars, musical instrument parts, musical interval parts, codes, and styles. Moreover, "new record or old record," "presence or absence of tie-up," and others are also collected as musical composition information. Further, the feature value extraction unit 111 may also extract information associated with users who views and listens to, purchases, or reproduces (uses) the musical compositions as feature values of the corresponding musical compositions. Examples of information associated with the users include attribute information (e.g., ages, genders, districts, and nationalities), social graphs, and channels (means for viewing and listening, purchase, or reproduction of the musical compositions, e.g., what SNS (Social Networking Service) is used, whether live reproduction is used), reproduction environments (e.g., time, place, and position information), accompanying information (e.g., reproduction order in reproduction with other musical compositions and reproduction device types), and others.

(Hit Element Specification Unit 112)

The hit element specification unit 112 specifies hit elements on the basis of an extracted feature values. For example, the hit element specification unit 112 can specify, on the basis of a feature value of each hit song, element information indicating an element whose number of times of reproduction is higher than a predetermined value. According to the present embodiment, therefore, analysis of not only hit factors in units of musical composition, but also hit factors in units of constituent element is achievable. Accordingly, element information indicating estimated hit factors (e.g., phrases, codes, musical intervals, musical instruments, and bars) can be specified.

(Survey Subject Musical Composition Comparison Unit 114)

The survey subject musical composition comparison unit 114 has a function for comparing a predetermined survey subject musical composition and a hit song. Specifically, the survey subject musical composition comparison unit 114 is capable of comparing a feature value of a predetermined survey subject musical composition with a feature value of a hit song, and specifying a hit song similar to the predetermined survey subject musical composition. For example, the survey subject musical composition comparison unit 114 can determine a position of a survey subject musical composition in a feature value space of a hit song. In a case where element information (material data) constituting a musical composition is extracted as a feature value on the basis of metadata added to the musical composition, the survey subject musical composition comparison unit 114 is capable of specifying a hit song using element information identical or similar to a survey subject musical composition by comparison with element information. Alternatively, the survey subject musical composition comparison unit 114 is also capable of deciding a degree of similarity of the survey subject musical composition to the hit song. Moreover, the survey subject musical composition comparison unit 114 can compare a predetermined survey subject musical composition with an element constituting a hit factor for comparison of an amount of the included hit element, and similarity to the hit element.

(Support Information Generation Unit 113)

The support information generation unit 113 generates support information associated with a musical composition (content) in response to a request from the user. For example, the support information generation unit 113 generates information indicating an advice of what condition is preferable for generating a musical composition on the basis of a hit song analysis result, and presents the information to the creator U1, or the AI creator U3 who generates the musical composition with use of an AI tool.

For example, the support information generation unit 113 presents a hit element specified by the hit element specification unit 112 (e.g., codes, musical instrument parts, musical intervals, and bars frequently used for a musical composition reproduced a large number of times). Moreover, the support information generation unit 113 may present a hit song element in a segment designated by the user (viewing and listening person layer such as age and gender). In this manner, for example, an artist is capable of acquiring support information in a segment where the artist desires to act (e.g., hit song element information in the corresponding segment).

Further, the support information generation unit 113 is capable of providing support information for a promising artist in a predetermined segment (e.g., an artist of a musical composition having an element of a hit song in the predetermined segment).

Further, the support information generation unit 113 generates information indicating an advice concerning selection of a segment and an appealing method (e.g., promotion) for a designated musical composition (survey subject musical composition) on the basis of a result of comparison with a hit song and presents the segment and the appealing method to a promotor U7 or the like. For example, the support information generation unit 113 presents a user attribute, a channel, a used appealing method, or the like included in a segment where a hit song sells well, the hit song using element information similar to element information associated with a survey subject musical composition.

Moreover, the support information generation unit 113 is also capable of predicting a musical composition which will be popular next, on the basis of a hit element specified by the hit element specification unit 112, and presenting a prediction result to the user as support information.

Accordingly, in the present system, an end user is capable of obtaining information indicating a segment suited for presentation of a musical composition desired to be sold, a channel suited for appealing, and a level of possibility of high popularity in a certain segment. Moreover, the end user is capable of obtaining an advice of a combination of elements improving a musical composition desired to be sold (i.e., likely to be sold more) (e.g., increasing pop melody lines, and a little more simplified song configuration).

(AI Created Work Generation Unit 103)

As described above, the AI created work generation unit 103 can generate an AI created work (AI musical composition) by AI with use of a musical composition and material data. Moreover, the AI created work generation unit 103 according to the present embodiment is further capable of generating an AI musical composition with use of hit element information specified by the hit element specification unit 112 as creation range information (frame information). More specifically, the AI created work generation unit 103 is capable of automatically generating an AI musical composition (i.e., hit musical composition) with use of material data specified as a hit element.

Further, the AI created work generation unit 103 is capable of presenting hit element information specified by the hit element specification unit 112 to a user who creates a musical composition with use of an AI tool (AI creator). For example, the AI created work generation unit 103 presents material data specified as a hit element in a segment designated by the user.

In addition, the AI created work generation unit 103 is also capable of generating a musical composition which guarantees serendipity. For example, at the time of generation of a musical composition for a certain segment, the AI created work generation unit 103 may generate the musical composition while inserting a hit element of an adjacent or different segment into the musical composition. Specifically, for example, an element of a trend for women in their twenties is used for generation of a musical composition for men in their thirties. Moreover, a musical composition which guarantees diversity can be generated by using a trend element of a different segment at a certain rate. Further, the AI created work generation unit 103 may generate a musical composition targeting an outer edge of a feature value space expected to become popular. At this time, the AI created work generation unit 103 may display a feature value space expected to become popular, and present visualized musical composition generation targeting the outer edge of the space in the form of a figure.

In addition, the AI created work generation unit 103 is capable of generating a musical composition by using an SNS graph (social graph; graph indicating a relation (linkage) between persons and enterprises on SNS). Specifically, for example, the AI created work generation unit 103 is capable of automatically generating a musical composition likely to become popular by referring to a social graph, paying attention to a person influential in a certain segment, and generating a musical composition with use of element information preferred by this person. Alternatively, the AI created work generation unit 103 is capable of generating a musical composition which guarantees serendipity by referring to a social graph, and generating a musical composition with use of element information preferred by a person not influential in a certain segment.

The functional configuration of the AI created work generation unit 103 according to the present embodiment has been described above. Note that the functional configuration described above is not required to be implemented by the single device (AI created work generation unit 103), but may be implemented by plural devices. In other words, the functional configuration depicted in FIG. 14 may be considered as a system configuration constituted by plural devices.

5-3. Operation Process

Subsequently, an operation process performed for presenting new created work support information in the present embodiment will be described with reference to FIG. 15. FIG. 15 is a flowchart presenting an example of a flow of a new created work support information presentation process based on hit song analysis according to the present embodiment.

As presented in FIG. 15, first, the hit song selection unit 110 specifies a target for hit song selection (period and segment (user layer)) (step S303). The target may be designated by the user or may be automatically decided.

Subsequently, the hit song selection unit 110 selects a hit song group in the specified target on the basis of the number of times of reproduction, for example (step S306).

Thereafter, the feature value extraction unit 111 acquires metadata of the selected hit song group (step S309) and extracts feature values of the hit song group (acquire a feature value space) (step S312).

Then, the hit element specification unit 112 specifies a hit element on the basis of the extracted feature values of the hit song group (step S315).

Subsequently, the AI created work generation unit 103 automatically generates a musical composition (AI musical composition) on the basis of the specified hit element (step S318).

Moreover, the support information generation unit 113 can generate UI for presenting information supporting composition or the like and present the generated UI to the creator U1 or the AI creator U3 (step S321).

On the other hand, the survey subject musical composition comparison unit 114 can compare a feature value space of a survey subject musical composition with a feature value space of a hit song (step S324), generate UI for presenting information supporting appeal (e.g., promotion) of the survey subject musical composition, and present the UI (step S327).

5-4. Advantageous Effects

According to the third embodiment, more detailed marketing analysis is achieved on the basis of metadata added to an AI created work (including AI creation metadata added to an AI created work) to provide effective support for a new created work.

6. SUMMARY

While the preferred embodiments of the present disclosure have been described above in detail with reference to the accompanying drawings, the present technology is not limited to these examples. It is obvious that those having ordinary knowledges in the technical field of the present disclosure can occur to various modification examples or correction examples within the scope of technical ideas described in the claims. It is understood that these also fall within the technical range of the present disclosure as a matter of course.

For example, a computer program for allowing hardware, such as the CPU, the ROM, the RAM, and the like built in the music providing server 10 (10-1 to 10-3) described above, to perform the functions of the music providing server 10 can be produced. Moreover, a recording medium computer-readable and storing this computer program is also provided.

Further, advantageous effects described in the present description are presented only for explanatory or exemplary purposes, and therefore are not considered as limited effects. In other words, the technology according to the present disclosure can offer other advantageous effects apparent for those skilled in the art in the light of the description of the present description in addition to or in place of the above advantageous effects.

Note that the present technology is allowed to have following configurations.

(1)

An information processing system including:

a content generation unit that generates content with use of one or more pieces of material data generated from original content; and a metadata addition unit that adds, to the content, content metadata including material information associated with the material data used for generation of the content and generation information associated with generation of the content.

(2)

The information processing system according to (1) described above, in which the content generation unit automatically generates, on the basis of the material data, the content with use of a predetermined rule or machine learning.

(3)

The information processing system according to (1) or (2) described above, in which the material information associated with the material data used for generation of the content is information allowing identification of the material data.

(4)

The information processing system according to any one of (1) to (3) described above, in which the generation information associated with generation of the content corresponds to details of generation of the content and includes information indicating at least a use mode of the material data.

(5)

The information processing system according to any one of (1) to (4) described above, in which information associated with right relations of the material data, and information allowing identification of original content of the material data are added to the material data as metadata.

(6)

The information processing system according to any one of (1) to (5) described above, further including:

a material generation unit that generates one or more pieces of the material data from original content, in which the metadata addition unit adds information associated with right relations of the material data, and information allowing identification of the original content of the material data to the generated material data as metadata.

(7)

The information processing system according to any one of (1) to (6) described above, in which the content generation unit generates new content with use of original content.

(8)

The information processing system according to any one of (1) to (7) described above, in which information associated with right relations of the original content is added to the original content as metadata.

(9)

The information processing system according to any one of (1) to (8) described above, in which the content is a musical composition, and the material data is range information, sound quality information, constituent element information, or abstract element information constituting music.

(10)

An information processing method performed by a processor, the method including:

generating content with use of one or more pieces of material data generated from original content; and adding, to the content, content metadata including material information associated with the material data used for generation of the content and generation information associated with generation of the content.

(11)

A program causing a computer to function as:

a content generation unit that generates content with use of one or more pieces of material data generated from original content; and a metadata addition unit that adds, to the content, content metadata including material information associated with the material data used for generation of the content and generation information associated with generation of the content.

REFERENCE SIGNS LIST

10 (10-1 to 10-3): Music providing server
20: Information processing terminal
30: Right management organization server
40: Metadata management server
100: Control unit
101: Metadata addition unit
102: Material generation unit
103: Created work generation unit
104: Use decision unit
105: Musical composition provision processing unit
106: Contribution rate determination unit
107: Feedback decision unit
108: Feedback presentation processing unit
110: Hit song selection unit
111: Feature value extraction unit
112: Hit element specification unit
113: Support information generation unit
114: Survey subject musical composition comparison unit
120: Communication unit
140: Storage unit

The invention claimed is:

1. An information processing system, comprising:

at least one processor configured to:

receive original content that includes a first musical composition;

decompose the original content into a plurality of pieces of material data of the first musical composition;

extract a plurality of feature values associated with the plurality of pieces of material data, wherein the plurality of feature values includes a tone, a scale, and a rhythm pattern;

determine, based on the plurality of feature values, a plurality of hit elements associated with the plurality of pieces of material data;

apply a machine learning model on at least one piece of material data of the plurality of pieces of material data of the first musical composition, wherein the at least one piece of material data is associated with at least one hit element of the plurality of hit elements, and the plurality of pieces of material data includes a plurality of bars associated with the first musical composition;

generate a specific bar based on each of the applied machine learning model and the plurality of bars, wherein the specific bar is different form the plurality of bars, and the plurality of bars is associated with the decomposition of the original content in a time direction;

change, based on the application of the machine learning model, the at least one piece of material data of the first musical composition;

generate specific content based on the changed at least one piece of material data of the first musical composition and the at least one hit element of the plurality of hit elements;

add content metadata to the generated specific content, wherein the content metadata includes:

material information associated with the changed at least one piece of material data of the first musical composition, generation information associated with each of the generation of the specific content and the generated specific bar, first information that indicates the changed at least one piece of material data of the first musical composition, and second information associated with the extraction of the plurality of feature values;

determine, based on the addition of the content metadata to the specific content, contribution information of a right related person, wherein the at least one piece of material data of the first musical composition is associated with the right related person;

determine support information based on the contribution information; and control a user interface (UI) to display the support information.

2. The information processing system according to claim 1, wherein the at least one processor is further configured to automatically generate the specific content based on a specific rule.

3. The information processing system according to claim 1, wherein the material information includes information associated with an identification of the changed at least one piece of material data.

4. The information processing system according to claim 1, wherein the generation information corresponds to details of the generation of the specific content, and the generation information includes information indicating at least a use mode of the changed at least one piece of material data.

5. The information processing system according to claim 1, wherein the at least one processor is further configured to:

add, as original creation metadata, third information to the original content, wherein the third information is associated with right relations of the changed at least one piece of material data; and add, as material metadata, fourth information to the changed at least one piece of material data, wherein the fourth information is associated with an identification of the original content.

6. The information processing system according to claim 1, wherein the at least one processor is further configured to add, as metadata, third information and fourth information to the changed at least one piece of material data, wherein the third information is associated with right relations of the changed at least one piece of material data, and the fourth information is associated with an identification of the original content.

7. The information processing system according to claim 1, wherein the at least one processor is further configured to generate new content based on the original content.

8. The information processing system according to claim 1, wherein the at least one processor is further configured to add, as metadata, third information associated with right relations of the original content to the original content.

9. The information processing system according to claim 1, wherein the generated specific content includes a second musical composition, and the plurality of pieces of material data includes at least one of range information, sound quality information, constituent element information, or abstract element information.

10. The information processing system according to claim 1, wherein the plurality of pieces of material data of the first musical composition includes at least one of a code of the first musical composition or a style of the first musical composition, and the at least one of the code of the first musical composition or the style of the first musical composition is changed based on the application of the machine learning model.

11. An information processing method, comprising:

receiving, by at least one processor, original content that includes a musical composition;

decomposing, by the at least one processor, the original content into a plurality of pieces of material data of the musical composition;

extracting a plurality of feature values associated with the plurality of pieces of material data, wherein the plurality of feature values includes a tone, a scale, and a rhythm pattern;

determining, based on the plurality of feature values, a plurality of hit elements associated with the plurality of pieces of material data;

applying, by the at least one processor, a machine learning model on at least one piece of material data of the plurality of pieces of material data of the musical composition, wherein the at least one piece of material data is associated with at least one hit element of the plurality of hit elements, and the plurality of pieces of material data includes a plurality of bars associated with the musical composition;

generating a specific bar based on each of the applied machine learning model and the plurality of bars, wherein the specific bar is different form the plurality of bars, and the plurality of bars is associated with the decomposition of the original content in a time direction;

changing, by the at least one processor, based on the application of the machine learning model, the at least one piece of material data of the musical composition;

generating, by the at least one processor, specific content based on the changed at least one piece of material data of the musical composition and the at least one hit element of the plurality of hit elements;

adding, by the at least one processor, content metadata to the generated specific content, wherein the content metadata includes:

material information associated with the changed at least one piece of material data of the musical composition, generation information associated with each of the generation of the specific content and the generated specific bar, first information that indicates the changed at least one piece of material data of the musical composition, and second information associated with the extraction of the plurality of feature values;

determining, based on the addition of the content metadata to the specific content, contribution information of a right related person, wherein the at least one piece of material data of the musical composition is associated with the right related person;

determining support information based on the contribution information; and controlling a user interface (UI) to display the support information.

12. A non-transitory computer-readable medium having stored thereon, computer-executable instructions which, when executed by a computer, cause the computer to execute operations, the operations comprising:

receiving original content that includes a musical composition;

decomposing the original content into a plurality of pieces of material data of the musical composition;

extracting a plurality of feature values associated with the plurality of pieces of material data, wherein the plurality of feature values includes a tone, a scale, and a rhythm pattern;

determining, based on the plurality of feature values, a plurality of hit elements associated with the plurality of pieces of material data;

applying a machine learning model on at least one piece of material data of the plurality of pieces of material data of the musical composition, wherein the at least one piece of material data is associated with at least one hit element of the plurality of hit elements, and the plurality of pieces of material data includes a plurality of bars associated with the musical composition;

generating a specific bar based on each of the applied machine learning model and the plurality of bars, wherein the specific bar is different form the plurality of bars, and the plurality of bars is associated with the decomposition of the original content in a time direction;

changing, based on the application of the machine learning model, the at least one piece of material data of the musical composition;

generating specific content based on the changed at least one piece of material data of the musical composition and the at least one hit element of the plurality of hit elements;

adding content metadata to the generated specific content, wherein the content metadata includes:

material information associated with the changed at least one piece of material data of the musical composition, generation information associated with each of the generation of the specific content and the generated specific bar, first information that indicates the changed at least one piece of material data of the musical composition, and second information associated with viewpoints of the extraction of the plurality of feature values;

determining, based on the addition of the content metadata to the specific content, contribution information of a right related person, wherein the at least one piece of material data of the musical composition is associated with the right related person;

determining support information based on the contribution information; and controlling a user interface (UI) to display the support information.

* * * * *